US010986936B2

(12) United States Patent
Dahl et al.

(10) Patent No.: US 10,986,936 B2
(45) Date of Patent: Apr. 27, 2021

(54) TIERED VOID CELLS

(71) Applicant: Skydex Technologies, Inc., Centennial, CO (US)

(72) Inventors: Jerod Dahl, Centennial, CO (US); Peter M. Foley, Castle Rock, CO (US)

(73) Assignee: SKYDEX TECHNOLOGIES, INC., Centennial, CO (US)

( * ) Notice: Subject to any disclaimer, the term of this patent is extended or adjusted under 35 U.S.C. 154(b) by 680 days.

(21) Appl. No.: 15/726,064

(22) Filed: Oct. 5, 2017

(65) Prior Publication Data

US 2018/0098639 A1    Apr. 12, 2018

Related U.S. Application Data

(60) Provisional application No. 62/404,969, filed on Oct. 6, 2016.

(51) Int. Cl.
| A47C 27/08 | (2006.01) |
| A47C 27/06 | (2006.01) |
| B23P 19/04 | (2006.01) |
| A47C 23/00 | (2006.01) |
| A47C 31/00 | (2006.01) |

(52) U.S. Cl.
CPC ............ *A47C 27/08* (2013.01); *A47C 27/065* (2013.01); *B23P 19/04* (2013.01); *A47C 23/002* (2013.01); *A47C 31/00* (2013.01)

(58) Field of Classification Search
CPC ..... A47C 23/002; A47C 23/05; A47C 23/055; A47C 23/063; A47C 23/064; A47C 23/067; A47C 23/14; A47C 23/18; A47C 23/20; A47C 23/24; A47C 23/30; A47C 23/32;

(Continued)

(56) References Cited

U.S. PATENT DOCUMENTS 5,976,451 A    11/1999  Skaja
6,029,962 A *   2/2000  Shorten .................. B29C 66/54
                                                        267/145

(Continued)

FOREIGN PATENT DOCUMENTS

DE    202006012598 U1    11/2006

OTHER PUBLICATIONS

International Search Report and Written Opinion, Korean Intellectual Property Office, dated Jan. 16, 2018.

(Continued)

*Primary Examiner* — Robert G Santos
*Assistant Examiner* — Rahib T Zaman
(74) *Attorney, Agent, or Firm* — Holzer Patel Drennan

(57) ABSTRACT

The disclosed technology includes tiered void cells which provide protection, comfort, and stability during compression. The tiered void cells may be arranged in vertically stacked columns and include a stroke whereby tiers of a void cell can telescope into adjacent tiers of that void cell, as well as telescope into adjacent tiers of adjacent void cells in a column. Implementations described and claimed herein include a cushioning system comprising an array of tiered void cells, wherein each tiered void cell includes a base portion, a plunger portion, the plunger portion to collapse into the base portion under compression of the cushioning system, and a living hinge elastically connecting an inner perimeter of the base portion to an outer perimeter of the plunger portion.

21 Claims, 17 Drawing Sheets

(58) Field of Classification Search
CPC ....... A47C 27/04; A47C 27/06; A47C 27/065; A47C 27/08; A47C 31/00; B23P 19/04
See application file for complete search history.

(56) References Cited

U.S. PATENT DOCUMENTS

| | | | |
|---|---|---|---|
| 6,777,062 B2* | 8/2004 | Skaja | B32B 3/26 428/143 |
| 8,904,584 B2* | 12/2014 | Sugano | B32B 7/04 5/652 |
| 2003/0221336 A1* | 12/2003 | Krstic | F16F 3/02 36/93 |
| 2005/0091750 A1 | 5/2005 | Radice | |
| 2005/0120483 A1* | 6/2005 | Clapper | A47C 7/742 5/654 |
| 2006/0277685 A1* | 12/2006 | Foley | A47C 7/021 5/653 |
| 2007/0147956 A1* | 6/2007 | Spingler | F16F 7/125 404/6 |
| 2011/0163885 A1* | 7/2011 | Poulos | A61G 7/05776 340/626 |
| 2011/0283876 A1* | 11/2011 | Foley | F41H 7/042 89/36.02 |
| 2012/0175206 A1* | 7/2012 | Kanous | F16F 7/121 188/377 |
| 2013/0326819 A1* | 12/2013 | Wyman | A42B 3/127 5/738 |
| 2014/0137333 A1 | 5/2014 | DeFranks | |
| 2014/0210250 A1* | 7/2014 | DiFelice | B60N 2/525 297/452.48 |
| 2014/0237728 A1* | 8/2014 | Oh | A47C 27/146 5/730 |
| 2015/0033577 A1* | 2/2015 | Dahl | A43B 13/20 36/28 |
| 2015/0072103 A1* | 3/2015 | Tresso | B32B 3/20 428/116 |
| 2015/0223547 A1 | 8/2015 | Wibby | |
| 2016/0066649 A1 | 3/2016 | Foley et al. | |
| 2016/0166076 A1 | 6/2016 | Mossbeck | |
| 2016/0235132 A1 | 8/2016 | Sugano et al. | |
| 2016/0270546 A1* | 9/2016 | Codos | A47C 27/064 |
| 2017/0008249 A1* | 1/2017 | Parsons | A41D 31/28 |
| 2017/0027336 A1 | 2/2017 | Wyman et al. | |
| 2017/0072653 A1* | 3/2017 | Dahl | B29D 99/0092 |
| 2017/0208960 A1 | 7/2017 | Sugano et al. | |

OTHER PUBLICATIONS

Search Report dated Feb. 5, 2020 for European Patent Application 17859209.3.

* cited by examiner

TIERED VOID CELLS

CROSS-REFERENCE TO RELATED APPLICATIONS

The present application claims benefit of priority to U.S. Provisional Patent Application No. 62/404,969 entitled "Tiered Void Cells" and filed on Oct. 6, 2016, which is specifically incorporated by reference for all that it discloses or teaches.

BACKGROUND

Cushioning systems are used in a wide variety of applications including comfort and impact protection of the human body. A cushioning system can be placed under a portion of the body and provides protection, comfort and stability. For example, a pocketed spring mattress contains an array of close-coupled metal springs that cushion the body from a bed frame. Similarly, footwear, chairs, couches, etc. may each include a cushioning system that provides a barrier between a portion of the body and one or more objects.

A variety of structures are used for cushioning systems. For example, an array of close-coupled, closed-cell air and/or water chambers often constitutes air and water mattresses. An array of close-coupled, helical, metallic springs often constitutes a conventional mattress. Further examples include open or closed cell foam and elastomeric honeycomb structures.

SUMMARY

Implementations described and claimed herein include a cushioning system comprising an array of tiered void cells, wherein each tiered void cell includes a base portion, a plunger portion, the plunger portion to collapse into the base portion under compression of the cushioning system, and a living hinge elastically connecting an inner perimeter of the base portion to an outer perimeter of the plunger portion.

This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter. These and various other features and advantages will be apparent from a reading of the following Detailed Descriptions.

BRIEF DESCRIPTIONS OF THE DRAWINGS

Figure 11A:
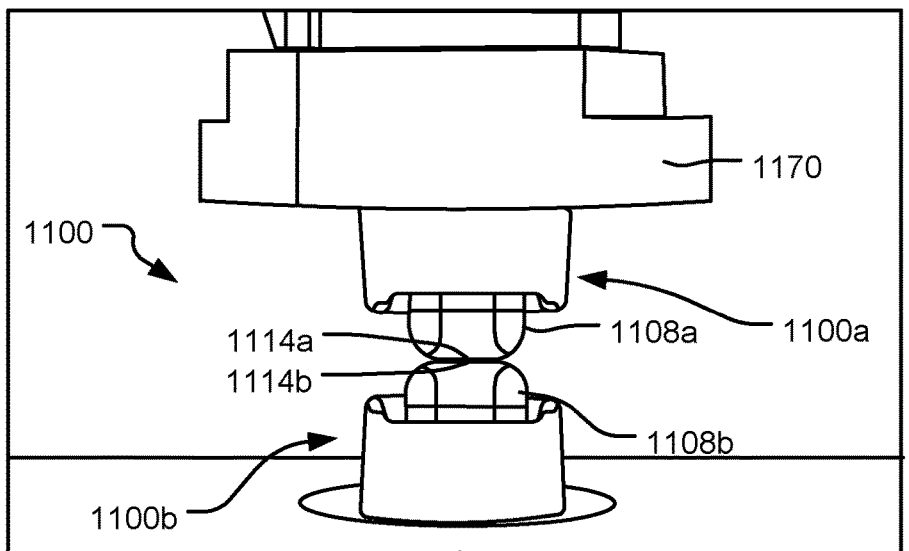
Figure 11B:
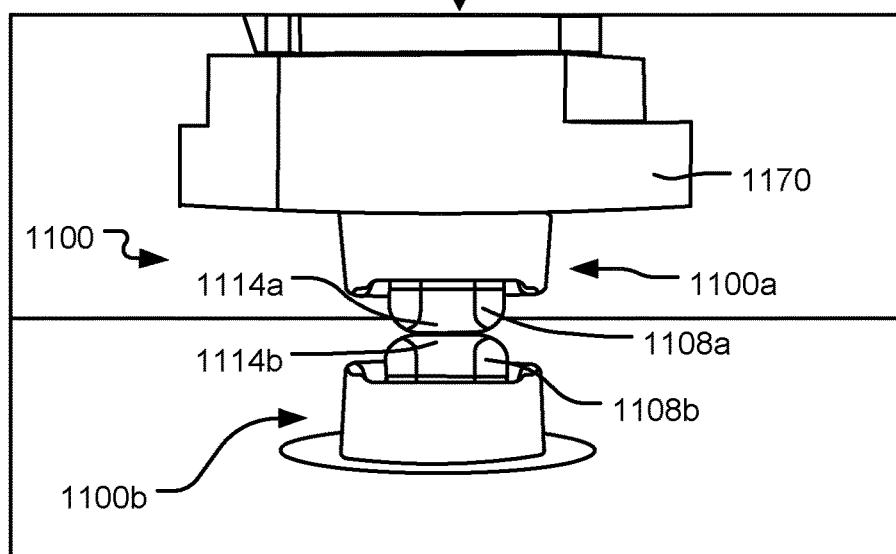
Figure 11C:
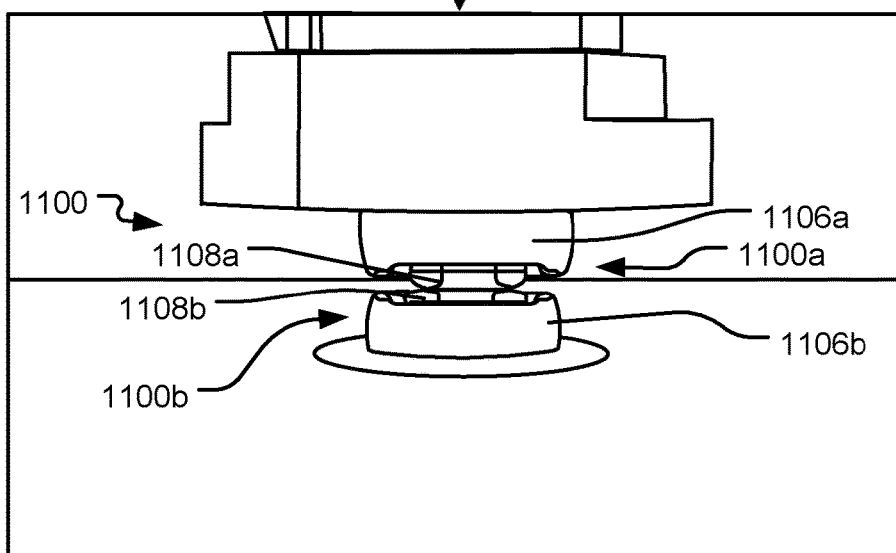

FIG. 11A-C illustrate a side perspective view of an example array of stacked tiered void cells before and during compression.

Figure 12:
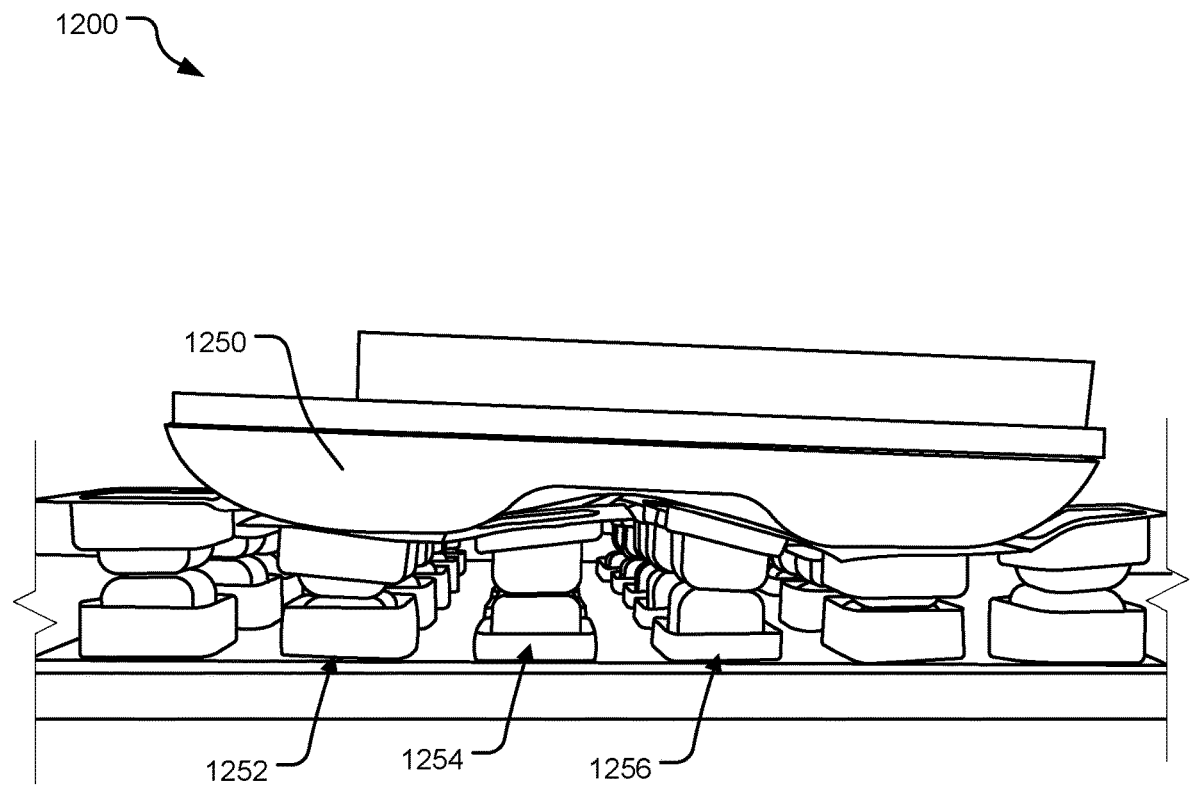

FIG. 12 illustrates a side perspective view of an example array of stacked tiered void cells during compression.

Figure 13:
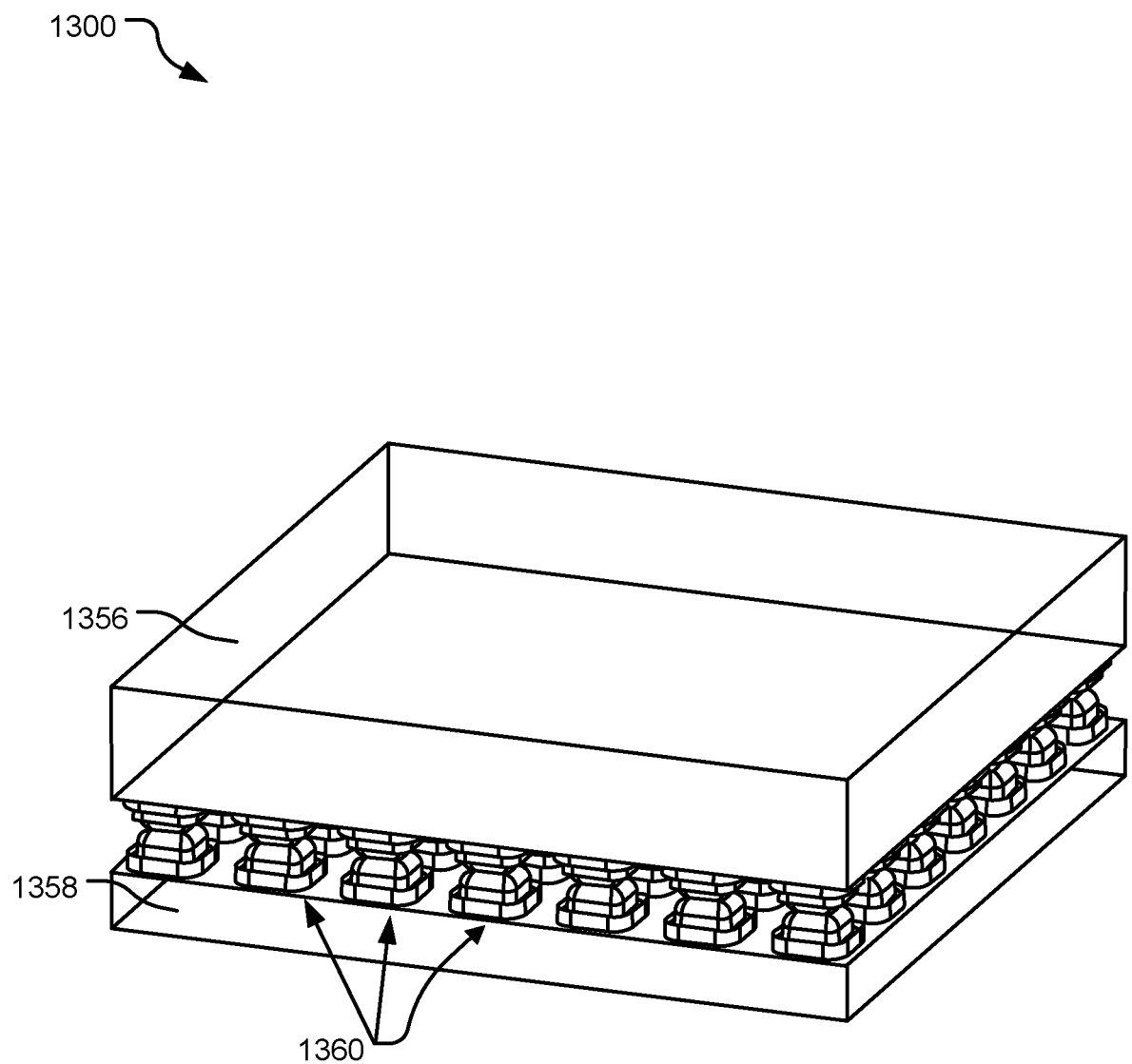

FIG. 13 illustrates a side perspective view of an example array of stacked tiered void cells in a cushioning system.

Figure 14:
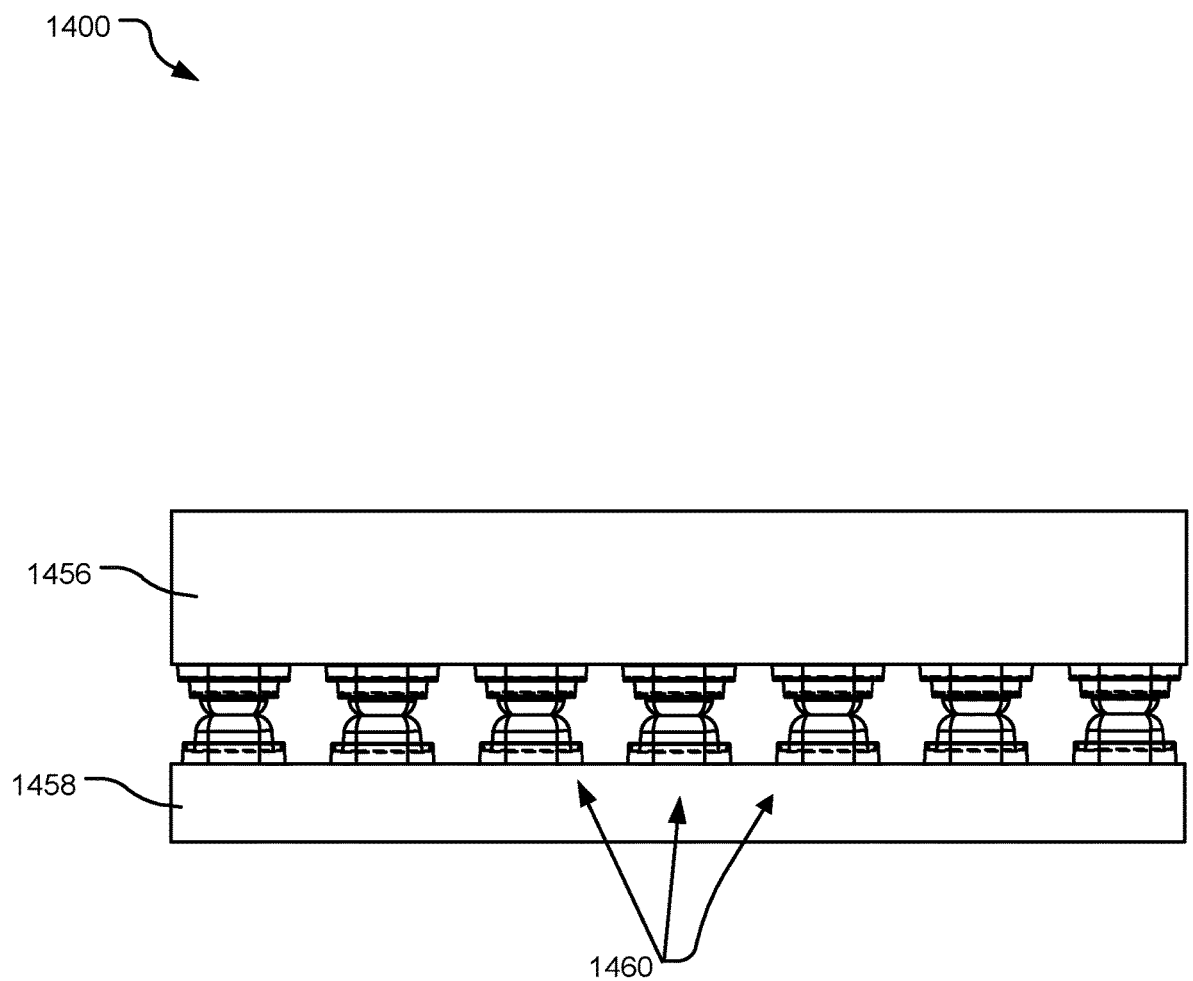

FIG. 14 illustrates a side view of an example array of stacked tiered void cells in a cushioning system.

Figure 15:
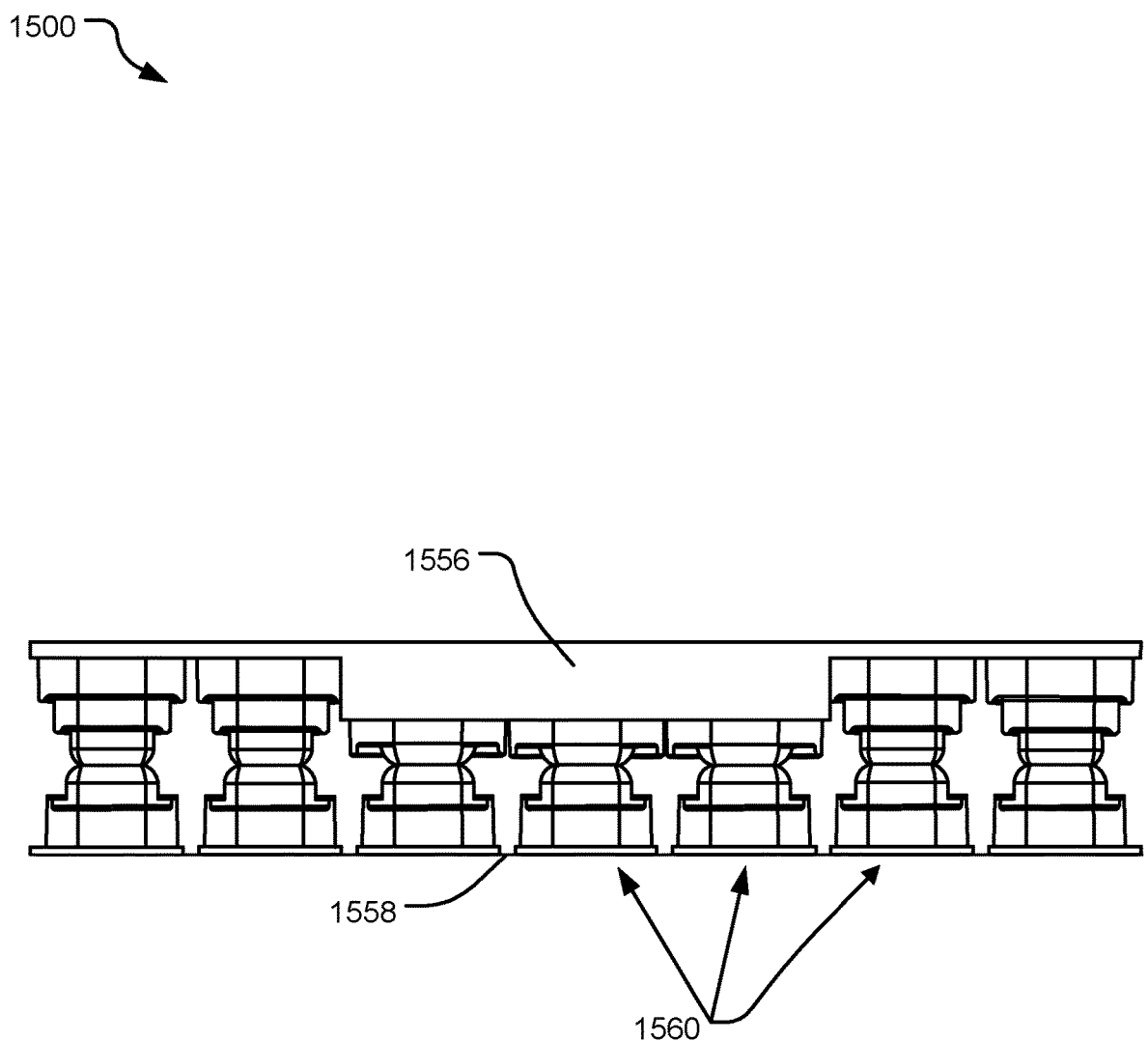

FIG. 15 illustrates a side view of an example array of stacked tiered void cells in a cushioning system.

Figure 16:
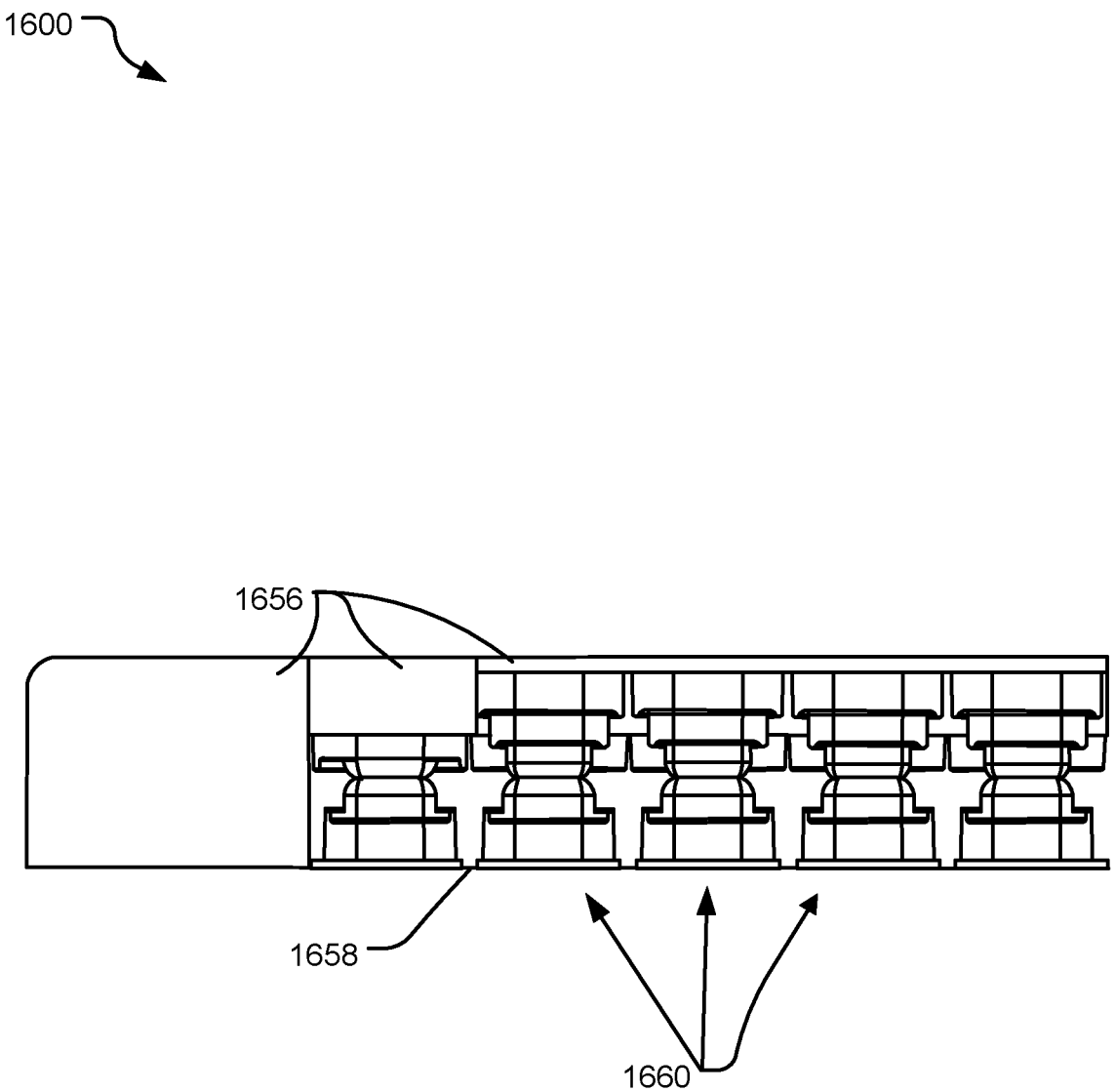

FIG. 16 illustrates a side view of an example array of stacked tiered void cells in a cushioning system.

Figure 17:
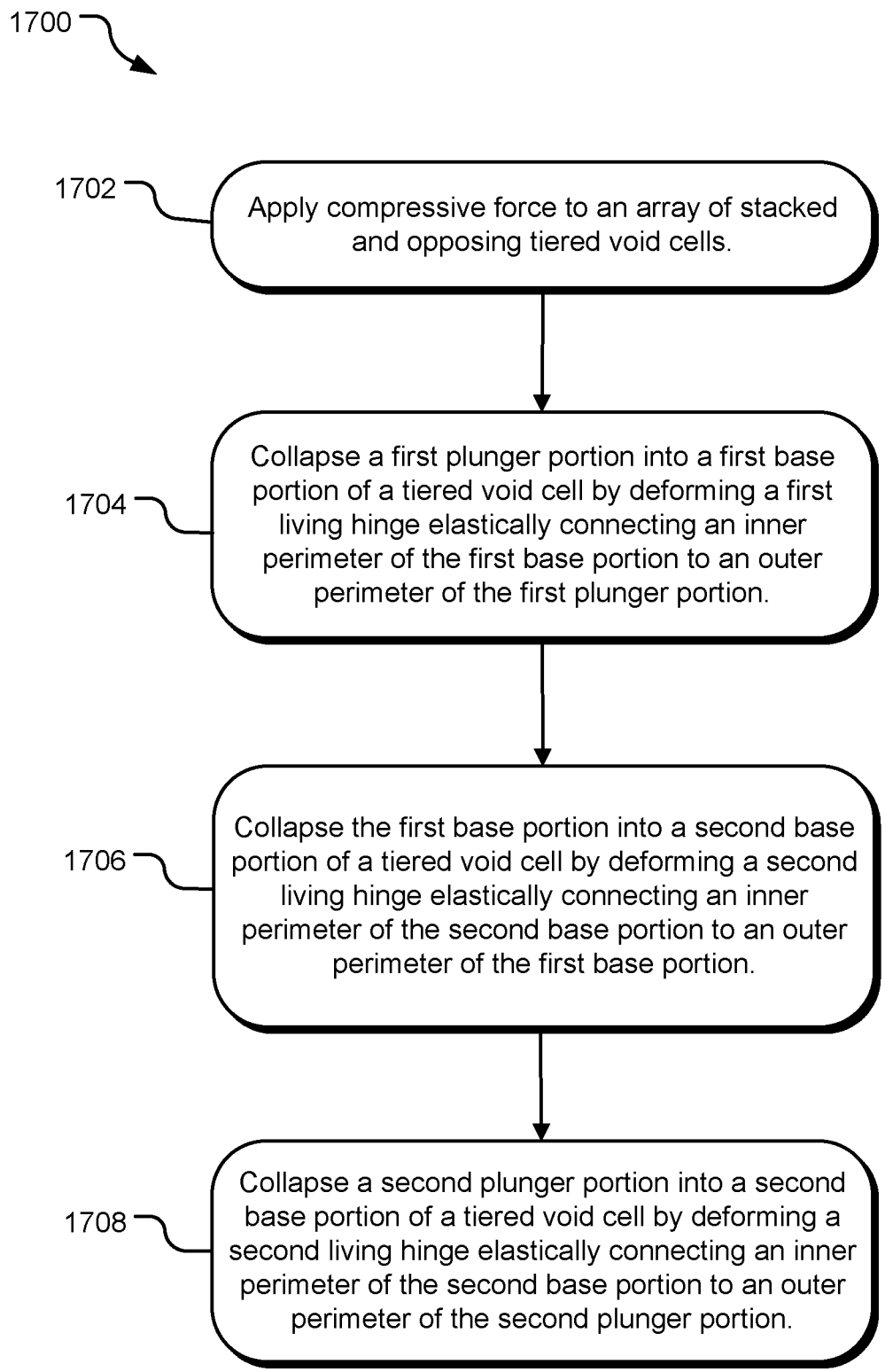

FIG. 17 is a flowchart of example operations for using a cushioning system.

DETAILED DESCRIPTIONS

The disclosed technology includes tiered void cells which provide protection, comfort, and stability during compression. The tiered void cells may be arranged in vertically stacked columns and include a stroke whereby tiers of a void cell can telescope into adjacent tiers of that void cell, as well as telescope into adjacent tiers of adjacent void cells in a column.

The tired void cells may be stacked in columns in the same or in different directions, and the stacks of tiered void cells may include void cells of varying numbers of tiers, footprint, size, and materials. The tiered void cells may provide different strokes at different parts of a stacked column, and different strokes from a neighboring stack or array of tiered void cells in a cushioning system. The tiered void cells may be incorporated into a variety of cushioning systems, including mattresses and seating.

Figure 1:
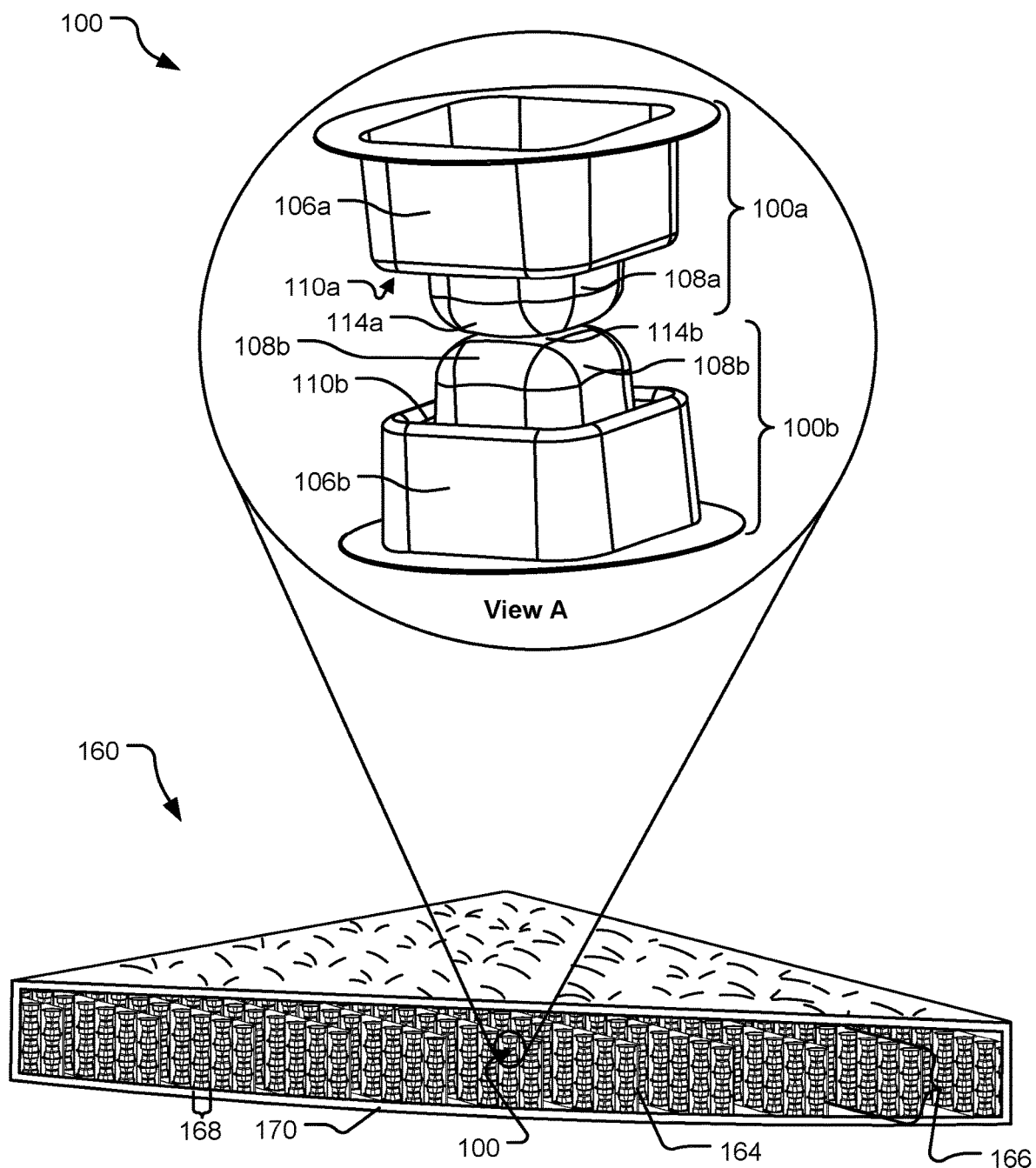
FIG. 1 illustrates a perspective view of example stacked tiered void cells in a mattress and a detailed view thereof.

FIG. 1 illustrates a perspective view of example stacked tiered void cells (e.g., void cells 100, also shown in an exploded View A) in a mattress 160. The tiered void cells 100 are molded into vertically stacked columns 168 in an array 166. As shown in View A, two-tiered void cells 100 (e.g., void cell 100a and void cell 100b) may be stacked on top of another. Each tiered void cell in View A comprises a base portion 106 and a plunger portion 108.

For purposes of this disclosure, a "tier" may be a defined as a level, a step, or a row of a void cell structure. A "tiered void cell" may be defined as a void cell including more than one tier. For example, a base portion constitutes a tier and a plunger portion constitutes a tier. Thus, since each tiered void cell in View A has a base portion 106 and a plunger portion 108, each tiered void cell has two tiers. In other implementations, a void cell may have more than two tiers. For example, a void cell may have three tiers, which includes two base portions and a plunger portion. In another example, a void cell may have four tiers, which includes three base portions and a plunger portion, and so on. The number of tiers can impact the collapsibility and stroke of the tiered void cell. In some implementations, the tiers of the tiered void cells 100 may have differently sized perimeters, and upon compression, tiers with smaller perimeters may collapse with the walls of the tiers with larger perimeters.

Referring to View A, the base portions 106a and 106b and the plunger portions 108a and 108b of each of the tiered void cells 100 have a square opening with a trapezoidal prism volume. In some implementations, the plunger portions 108a and 108b may have top surfaces 114a and 114b, and the top surfaces 114a and 114b may or may not have a dome. In FIG. 1, the plunger portions 108a and 108b of each of the tiered void cells 100 have a rounded top surface 114 and do not have a dome. In some implementations, the plunger portions 108a and 108b may have other shaped openings, volumes, and top surfaces.

The base portions 106a and 106b and the plunger portions 108a and 108b can be attached via a variety of components, such as a living hinge 110 (e.g., a connector, a channel, a trough, a chamfer, a step, etc.). In FIG. 1, the base portions 106a and 106b and the plunger portions 108 are elastically attached via living hinges 110a and 110b located between the top perimeter of the base portions 106a and 106b and the bottom perimeter of the plunger portions 108a and 108b. The living hinges 110a and 110b may range in size. For example, the living hinges 110a and 110b can have a significant depth or substantially little to no depth. The depth and width of a living hinges 110a and 110b may vary, and the dimensions of the living hinges 110a and 100b contribute to or define the flex of the tiered void cells 100.

In various implementations, the living hinges 110a and 110b of each tiered void cell 100 may be constructed with the same potential materials as the tiered void cells 100 (listed above) and/or different potential materials (e.g., plastics, textiles, metal screens, etc.). Further, the living hinges 110a and 110b may be a solid sheet, woven mesh, or perforated sheet. In mesh or perforated sheet implementations, the living hinges 110a and 110b may act to link the tiered void cells 100 together while allowing fluid flow through the living hinge 110a and 110b.

In some implementations, living hinges 110a and 110b may be attached to plunging portions 108a and 108b or base portions 106a and 106b via permanent and/or removable connections (e.g., a glued connection, a melted connection, a UV-cured connection, a radio-frequency (RF) welded connection, a laser-welded connection, another welded connection, a sewn connection, and a hook-and-loop connection).

In FIG. 1, the two-tiered void cells 100 are shown stacked in opposite directions, with the rounded top surface 114a of one tiered void cell 100a attached to the rounded top surface 114b of the other tiered void cell 100b.

In this implementation, upon compression, compressive force may be applied to the tiered void cell 100a. The plunger portions 108a and 108b of each of the tiered void cells 100 can collapse or telescope into the base portions 106a and 106b of each tiered void cell, while simultaneously applying compressive force against the plunger portions 108a and 108b of the opposing tiered void cell, by deforming the living hinges 110a and 110b.

In implementations where there are multiple tiered void cells stacked in a column, multiple plunger portions collapse (or "plunge") into their respective base portions and against an opposing plunger portion. The internal components and geometries of the multiple tiered void cells, such as the multiple plunger portions, define the "spring" mechanism of the column.

A cushion layer 170 on the mattress 160 may surround the array 166 of void cells 100. In some implementations, the cushion layer 170 surrounds the array 166 of void cells 100 on all sides. In other implementations, the cushion layer 170 is located only on a top surface or a bottom surface, or only the side surfaces. The cushion layer 170 may include a variety of materials (e.g., dense foam, springs, etc.) In other implementations, the array 166 of void cells 100 may be implementing inside a cushion layer 170 in a different kind of cushioning system (e.g., a chair), and include other types of cushion layers and configurations. The dimensions of the cushion layer can vary depending on the implementation.

In some implementations, the array 166 of void cells 100 may be enclosed between a cushion layer 170 in an encasing (e.g., encasing 164). The encasing 170 can be made of a variety of materials (e.g., woven textiles, other fabrics, plastics, etc.). In some implementations, each vertically stacked column 168 of void cells 100 may have encasing 164 surrounding it. The vertical columns 168 can be inserted into the encasing 164 and the encasing 164 can be sealed by a variety of components (e.g., heat sealed) (not shown). In some implementations, the tiered void cells 100 are not enclosed and are attached to neighboring void cells 100 in another column 168. For example, an elastic material or other flexible material, for example, may attach specific void cells 100 in neighboring vertical columns 168 to each other. The placement of the attachments between the vertical columns 168 can be varied to impact levels of dependency and moderate compressive force on the tiered void cells 100.

In some implementations, the vertical column 168 may be affixed to the sides and/or the top and bottom of the encasing 164 or freestanding. Each encasing can be attached to other encasings (e.g., for use in a mattress). The height of the vertical column 168 can vary, as well as the number of vertical columns 168. For example, if the vertical column 168 is enclosed in fabric for use in a mattress 160, the vertical column 168 and encasing 164 on the top and bottom of the vertical column 168 may be approximately 8-12 inches.

In this implementation, upon compression, compressive force is applied to an array 166 of void cells 100 or to a specific vertical column 168 of void cells 100. The compressive force compresses the rounded top surfaces 114a and 114b of the plunger portions 108a and 108b of the tiered void cells 100a together. The plunger portions 108a and 108b of the tiered void cells 100 compress (or "plunges") into the base portions 106a and 106b of the tiered void cells 100. In other implementations, other components of the tiered void cell 100 may compress, and at varying heights. In one implementation, the compression can reduce the height of the base portion 106 from 3 inches to ½ inch.

In an array 166, each individual tiered void cell 100 may move independent of an adjacent tiered void cell (not shown). The disclosed arrangement of the tiered void cells 100 provides isolation which contributes to distribution of forces and comfort as the tiered void cells 100 support a body, for example.

In some implementations, the tiered void cells can be individually formed and arranged in a vertical column 168 or an array 166. The vertical column 168 or array 166 may arrange void cells 100 either vertically or a horizontally. In other implementations, the vertical column 168 or the array 166 of tiered void cells 100 may be a continuous molded structure or sheet.

The tiered void cells 100 may be hollow chambers that resist a certain amount of deflection due to compressive forces, similar to compression springs. At least the material, wall thickness, size, and shape of each of the tiered void cells 100 define the resistive force that each of the tiered void cells 100 can apply. For example, upon compression on the top surface 114a of the plunger portion 108a of the tiered void cell 100a, the plunger portion 108b can collapse into the base portion 106b of the tiered void cell 100b by deforming the living hinge 110b.

A living hinge of a void cell can control (substantially promote or prevent) collapse of a plunger portion into a base portion. When a force is applied to a tier in a void cell, a living hinge (elastically connecting an inner perimeter of a base portion to an outer perimeter of a plunger portion) stretches or deforms, causing the plunger portion to collapse into the base portion. Depending on the size, depth, and material of the living hinge, the rate and depth upon which the plunger portion enters the base portion can vary. Such variables can also influence which tiers the plunger portion may enter.

For example, upon compression of the tiered void cells 100a and 100b, the living hinges 110a and 110b can control collapse of the plunger portion 108b of the tiered void cell 100b into the base portion 106b depending on the size, depth, and material of the living hinges 110a and 110b. Similarly, upon compression of the tiered void cells 100a and 100b, the living hinges 110a and 110b can control collapse of the plunger portion 108a of the tiered void cell 100a into the base portion 106b of the tiered void cell 100b.

Further, the size of each tier can influence collapsibility of the tiered void cell. As shown in FIG. 1, the opposing base portions 106a and 106b may have a similarly sized perimeter, and during compression of the opposing tiered void cells, although the plunger portions 108a and 108b collapse into adjacent tiers, the opposing base portions 106a and 106b interfere with each other and slow or inhibit collapsibility of the opposing base portions 106a and 106b.

The tiered void cells 100 may have one or more holes (not shown) through which air or other fluid may pass freely when the tiered void cells 100 are compressed and de-compressed. The tiered void cells 100 are fluidly open and communicating with the environment (open to atmosphere). In some implementations, the tiered void cells 100 are stacked and there may be venting of the tiered void cells 100 by connecting portions of the tiered void cells 100 to each other via the living hinges 110. By not relying on air pressure for resistance to deflection, the tiered void cells 100 can achieve a relatively constant resistance force to deformation.

In another implementation, the tiered void cells 100 may be closed with sealed air or have engineered air passages to regulated compression. The tiered void cells 100 may be filled with ambient air, a fluid other than air, and/or a foam. The tiered void cell fill material or fluid may be used to affect the insulating properties of the tiered void cells 100 or the compression characteristics of the individual tiered void cells 100. Still further, in a vacuum or near-vacuum environment (e.g., outer space), the hollow chambers may remain substantially un-filled.

Each of the individual void cells may be individually manufactured using a variety of techniques (e.g., blow molding, thermoforming, extrusion, injection molding, laminating, etc.). The tiered void cell material is generally elastically deformable under expected load conditions and will withstand numerous deformations without fracturing or suffering other breakdown impairing the function of the tiered void cells 100. Example materials include ethylene vinyl acetate (EVA), thermoplastic urethane, thermoplastic elastomers, styrenic co-polymers, rubber, Dow Pellethane®, Lubrizol Estane®, Dupont™ Hytrel®, ATOFINA Pebax®, and Krayton polymers. However, in some implementations, the tiered void cell material or certain components of the tiered void cell material (e.g., the connector) may be a solid or less elastomeric material. For example, the tiered void cell may be manufactured for a single impact (i.e., one-time use) or manufactured for a single impact under certain predetermined loads. In another example, the connector of a tiered void cell may be multi-use but the other components of the tiered void cell may be one-time use.

The wall thickness of each of the tiered void cells may range from 5 mil to 250 mil. Further, the wall thickness of each of the tiered void cells 100 may be substantially the same (or vary by no more than 10%) over the surface area of each void cell 100. Still further, the size of each of the tiered void cells 100 may range from 5 mm to 200 mm sides in a cubical implementation. Further yet, the tiered void cells 100 may be cubical, pyramidal, hemispherical, hexagonal, or any other shape capable of having a hollow interior volume. Other shapes may have similar dimensions as the aforementioned cubical implementation. The shape and dimensions of the top surfaces 114a and 114b of each tiered void cell 100 can vary as well. For example, as shown in FIG. 1A, top surfaces 114a and 114b of the tiered void cells 100 are round.

In some implementations, the tiered void cells 100 may be stacked in a vertical column. The tiered void cells 100 can be stacked on top of each other with one or more tiered cells 100 facing a different direction vertically (as shown and described in FIGS. 1 and 6-8). In other implementations, the tiered void cells 100 may be stacked on top of each other with one or more tiered cells 100 facing the same direction vertically and with one or more tiered cells 100 facing a different direction vertically (as shown and described in FIG. 9). In other implementations (not shown), the tiered void cells 100 may be stacked on top of each other with one or more tiered cells 100 facing the same direction vertically.

Choice of void cell material, geometry, and/or wall thickness determines the force-deflection characteristics of each void cell 100. In order to tune the column for a particular application where a varied load distribution is expected to be applied to the column (e.g., on a seat or mattress), the individual tiered void cell 100 may be tuned to apply different reaction forces. For example, if a column of tiered void cells 100 is used for a mattress application, a peak load may occur beneath a user's prone or supine body. As a result, tiered void cells 100 in certain locations (e.g., tiered void cells located under a user's waist or hips) may be tuned to deflect under lower force (i.e., have a lower reaction force per unit of deflection) than other tiered void cells 100, as they may be more centrally located near a user's center of gravity. Such an arrangement serves to more evenly distribute the user's weight over the entire column of tiered void cells. Or, other tiered void cells 100 (e.g., tiered void cells located under a user's upper torso or legs) may be tuned with a higher reaction force per unit of deflection, as they are away from the heavier weight of a user's body. Other tiered void cells 100 (e.g., tiered void cells located near the head or feet in a bed) may be tuned an even higher reaction force per unit of deflection. In some implementations, the columns of tiered void cells 100 or an individual void cell 100 themselves are tuned with stiffer cells on or near a perimeter of the column in order to aid centering of a user sitting or lying on the column of tiered void cells 100.

Figure 2:
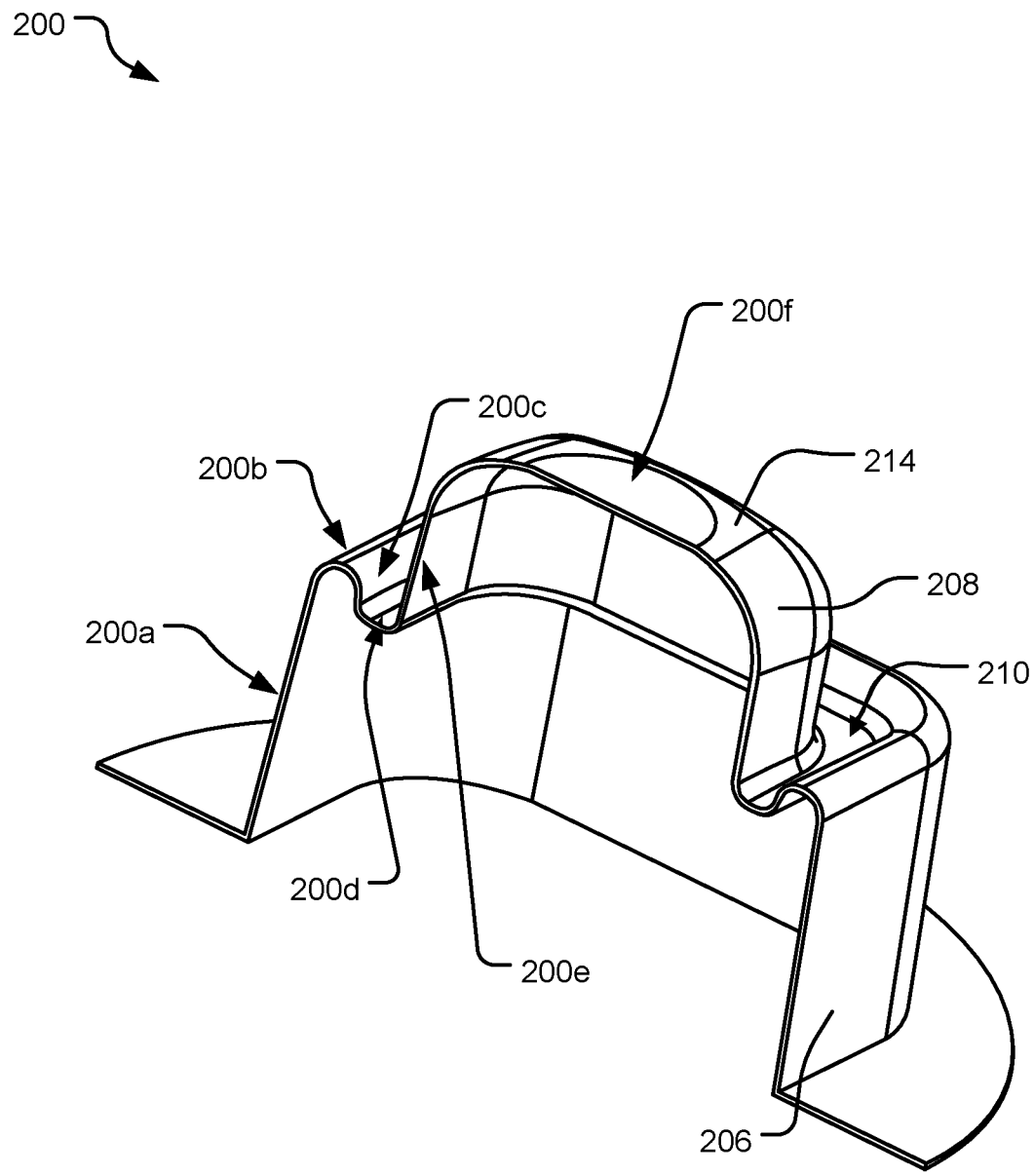
FIG. 2 illustrates a cross-sectional perspective view of an example tiered void cell.

FIG. 2 illustrates a cross-sectional perspective view of an example tiered void cell 200. The tiered void cell 200 in this implementation has two tiers (a base portion 206 and a plunger portion 208). The base portion 206 has a square opening with a trapezoidal volume. The base portion 206 is attached to a plunger portion 208 via a living hinge 210 located between the upper perimeter of the base portion 206 and the lower perimeter of the plunger portion 208. The plunger portion 208 has a square opening with a trapezoidal volume, and a rounded top surface 214. In another implementation, the tiered void cells may have one or more tiers, and have tiers with other shaped openings, volumes, and tops.

The geometries of the disclosed tiered void cells (e.g., tiered void cell 200) provide cushioning in a liner force/compression relationship without the noise and without the heavy collapse of other geometries that bend and buckle during compression as force is applied. The geometries provide stiffness and additional compression results in densification. Further, the geometries of the tiered void cells may be stackable.

In some implementations, the geometries of the tiered void cells may include interference in the tiered void cell design in collapsibility during compression. For example, during compression of two opposing tiered void cells, if a shoulder (or wall) of a base portion in one tier of a tiered void cell has a similarly sized perimeter of a shoulder of a base portion in the opposing tiered void cell, the shoulders of both opposing base portions may interfere with each other and slow or inhibit collapsibility of those tiers (see FIG. 1, base portions 106a and 106b have similar sized perimeters and their walls interfere with each other during compression slowing or inhibiting further collapsibility of the tiered void cell). Although some tiers in the opposing tiered void cells may collapse, for example, the plunger portions, the base portions may contact each other and prevent further collapse.

In some implementations, the geometries of the tiered void cells do not interfere in the tiered void cell design in collapsibility during compression. For example, if the tiers in one void cell have a smaller perimeter than opposing tiers in an adjacent tiered void cell in a stacked column of void cells, then the walls of the tiers in opposing tiered void cells may not interfere with each other during compression (see FIG. 8, first base portions 806a and 806b and second base portion 822 have different sized perimeters and the walls of those tiers do not interfere with each other.).

Referring to FIG. 2, features of the geometry of the tiered void cell 200 are depicted by six walls (or walls). These described walls can be tailored to an intended use and desired compression.

A first wall 200a is a side wall of the base portion 106 depicted in FIG. 1. The base portion 106, a sphere or square-shaped, has a linear force/compression curve.

A second wall 200b is a top wall (or shoulder) of the base portion 106 in FIG. 1. In one implementation, the second wall 200b is a horizontal, planar surface. In other implementations, the second wall 200b may be a horizontal, angled surface.

A third wall 200c is a first side wall of the living hinge 110 in FIG. 1. In one implementation, the third wall 200c is a vertical, planar wall. In other implementations, the third wall 200c may have a vertical, angled surface.

A fourth wall 200d is a bottom wall of the living hinge 110 in FIG. 1. In one implementation, the fourth wall 200d is a horizontal, planar surface. In other implementations, the fourth wall 200d may have a horizontal, angled surface.

A fifth wall 200e is a second side wall of the living hinge 110 in FIG. 1. In one implementation, the fifth wall 200e is a vertical, planar surface. In other implementations, the fifth wall 200e may have a vertical, angled surface.

A sixth wall 200f is a top wall of the plunger portion 108, which can include the top 214 of the plunger portion 208. In one implementation, the sixth wall 200f may have a horizontal, planar surface. In another implementation, the sixth wall 200f may have a horizontal, angled surface. In yet another implementation, a portion of the sixth wall 200f may be planar and other portions of the sixth wall 200f may be angled. For example, the top 114 of the plunger portion 108 may have angled transitions into multiple fifth walls 200e, yet have a horizontal, planar surface across the top surface and no dome. In some implementations, the sixth wall 200f may be a radius, which can be a dome.

The six walls (the first wall 200a, the second wall 200b, the third wall 200c, the fourth wall 200d, the fifth wall 200e, and the sixth wall 200f) and the relationships (including angles) between the walls define the shape of the tiered hemi and the rate of collapse and the force needed to collapse a tiered void cell.

In implementations where the tiered void cell has a geometry with multiple tiers, the walls of the second wall 200b, the third wall 200c, the fourth wall 200d, the fifth wall 200e, and the sixth wall 200f of each tier can have the same or different walls and angles defining each tier.

In implementations with multiple tiers, tiers are not stacked tip to tip or base to base rather the tiers are orientated tip to base with the second wall 200b, the third wall 200c, and the fourth wall 200d between the tiers. The overall geometry can then stack with another geometry tip to tip or base to base.

During compression, the geometry of a tiered void cell can collapse in various ways. For example, in one implementation, the first wall 200a, the fifth wall 200e, and the sixth wall 200f can buckle. In another implementation, the second wall 200b, the third wall 200c, and the fourth wall 200d can rotate. In yet another implementation, the second wall 200b, the third wall 200c, and the fourth wall 200d can stretch.

Figure 8:
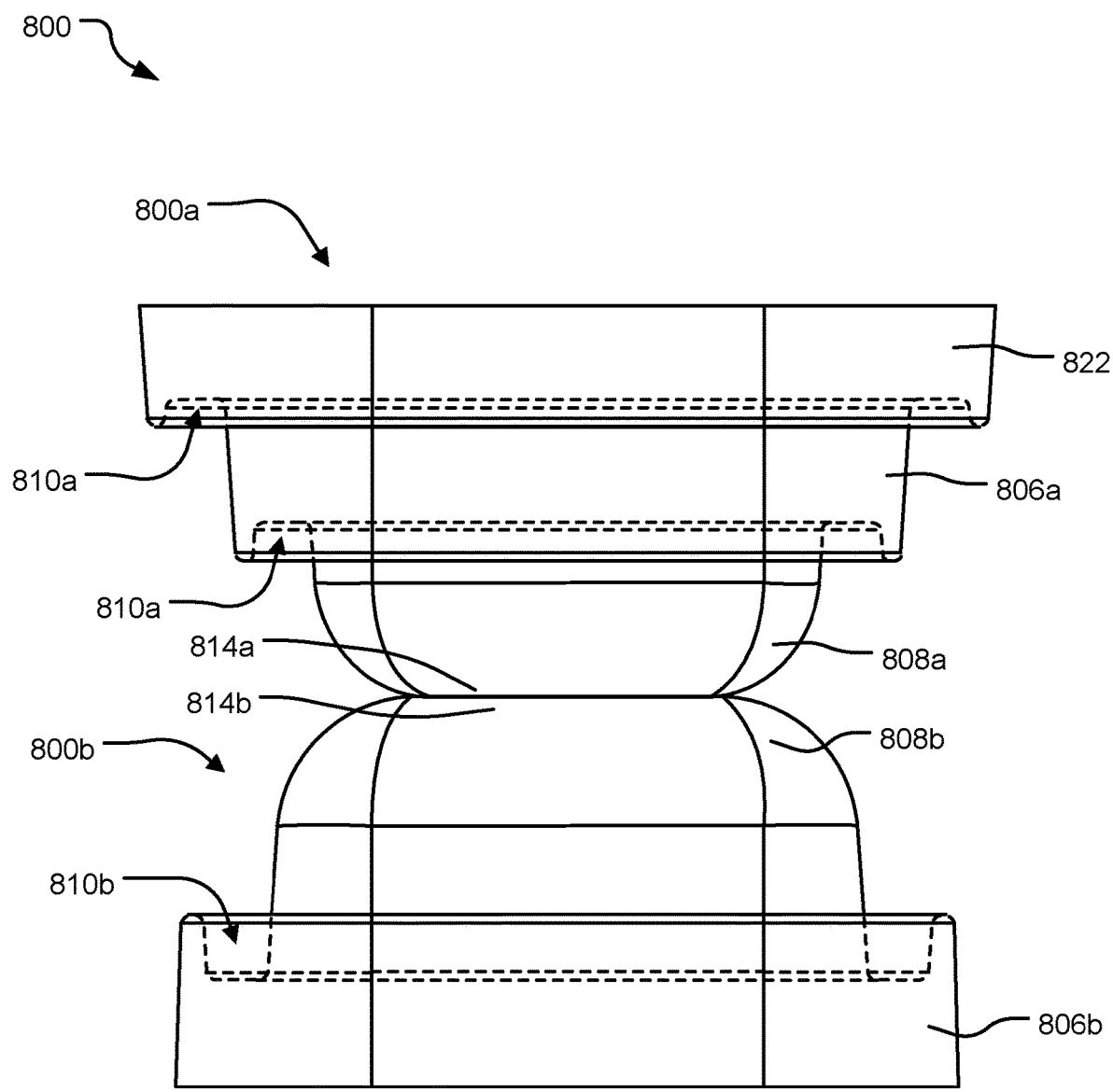
FIG. 8 illustrates a cross-sectional side view of example stacked tiered void cells.

In yet another implementation, in a twin or stacked arrangement, there can be a portion of any wall that encounters physical interference with a like portion of a wall in an opposing tier void cell (e.g., the second wall or shoulder 200b in a first tiered void cell and the second wall or shoulder 200b in a second tiered void cell prevent further compression of a tiered void cell, and described in FIG. 8).

The order in which the collapsing occurs and the behavior of the tiered void cell due to its geometry is defined by elastic modulus and the buckling force characteristics of each of the walls of the tiered void cells. In addition to geometrical relationships of the elements of the spring, these properties may be defined by raw material type and the thickness of the raw material. Various elements influence the behavior of the tiered void cell. The spring can be designed to produce very complex force/deflection curves incorporating many different slopes.

Details regarding the individually formed tiered void cells (including their geometries and materials), the living hinges, and the assembly of a stacked column of tiered void cells discussed with respect to FIGS. 1 and 2 are applicable to the following FIGS. 3-17.

Figure 3:
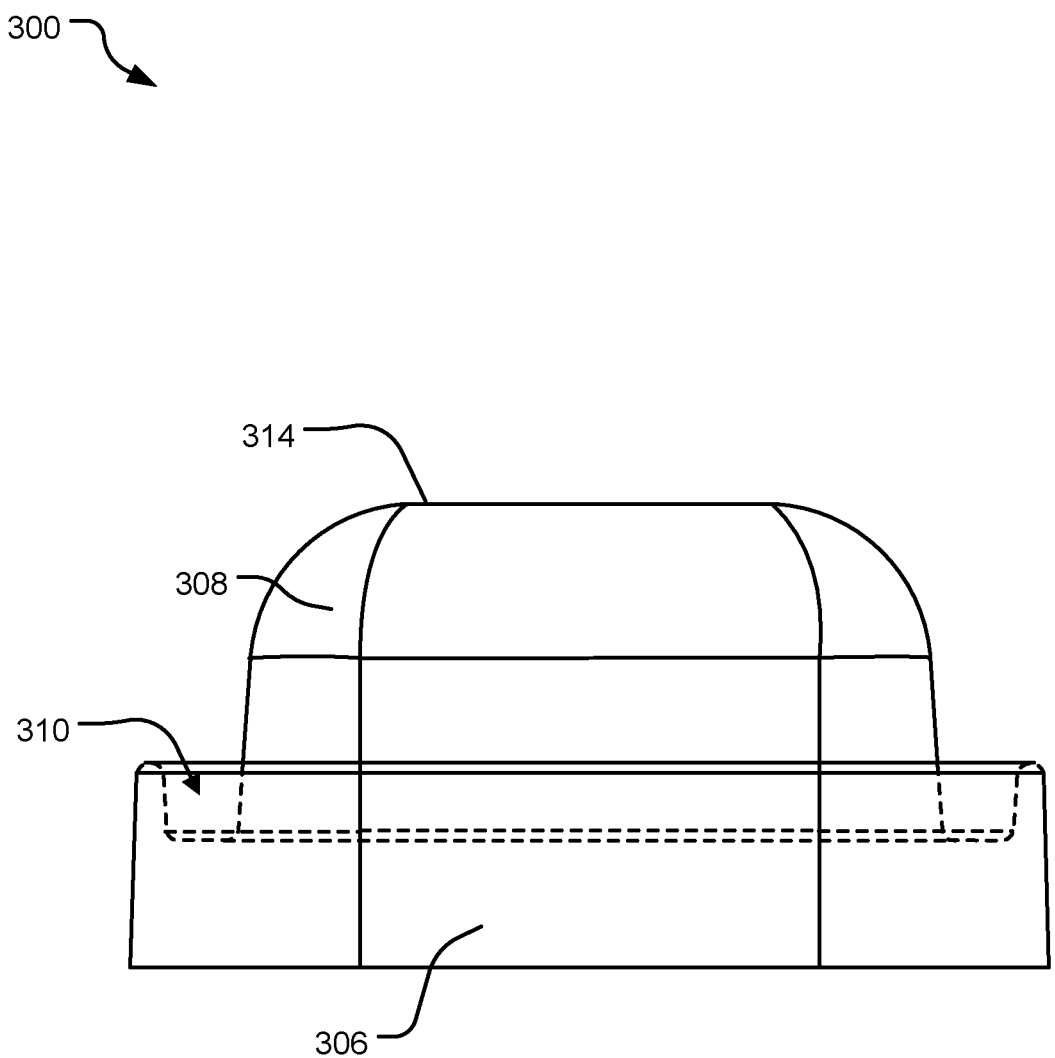
FIG. 3 illustrates a cross-sectional side view of an example individual tiered void cell.

FIG. 3 illustrates a cross-sectional side view of an example individual tiered void cell 300. The tiered void cell 300 in this implementation has two tiers, which comprise a base portion 306 and a plunger portion 308. The base portion 306 is attached to a plunger portion 308 via a living hinge 310 located between the upper perimeter of the base portion 306 and the lower perimeter of the plunger portion 307. The base portion 306 and the plunger portion 308 have a square opening with a trapezoidal volume. The plunger portion 307 has a rounded top 314. In another implementation, the tiered void cell 300 may have one or more tiers, and have tiers with other shaped openings, volumes, and tops.

In one implementation, upon compression, compressive force may be applied to the top surface 314 of the plunger portion 308 or the bottom surface of the base portion 306, and compress the plunger portion 308 into the base portion 324. The living hinge 310 of void cell 300 can control (substantially promote or prevent) collapse of the plunger portion 308 of void cell 300 into the first base portion 306 of void cell 300 depending on its width and depth, for example.

Figure 4:
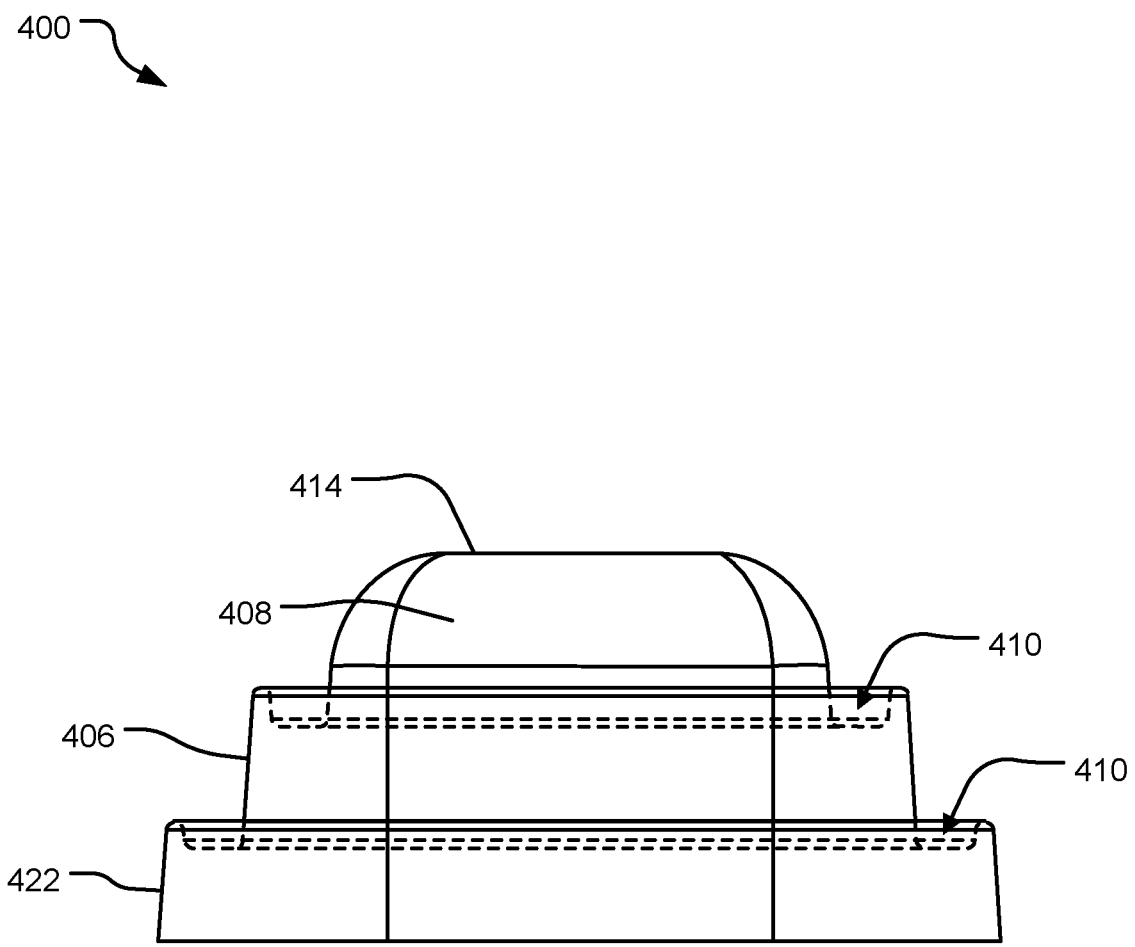
FIG. 4 illustrates a cross-sectional side view of another example individual tiered void cell.

FIG. 4 illustrates a cross-sectional side view of an example individual tiered void cell 400. The tiered void cell 400 in this implementation has three tiers, which comprise a plunger portion 408, a first base portion 406, and a second base portion 422. Each tier is attached to a neighboring tier via a living hinge 410 located between the upper perimeter of one tier and the lower perimeter of the neighboring tier. Specifically, there is a living hinge 410 connecting an inner perimeter of the base portion 406 to an outer perimeter of the plunger portion 408. There is a living hinge 410 connecting the outer perimeter of the first base portion 406 to the inner perimeter of the second base portion 422. The first base portion 406, the second base portion 422, and the plunger portion 408 each have a square opening with a trapezoidal volume. The plunger portion 408 has a rounded top.

In one implementation, upon compression, compressive force may be applied to the top surface 414 of the plunger portion 408 or the bottom surface of the second base portion 422, and compress the plunger portion 408 into the first base portion 406 and/or the first base portion 406 into the second base portion 422. The living hinges 410 of void cell 400 can control (substantially promote or prevent) collapse of the plunger portion 408 of void cell 400 into the first base portion 406 of void cell 400 and control the collapse of the first base portion 406 into the second base portion 422 depending on their width and depth, for example.

Figure 5:
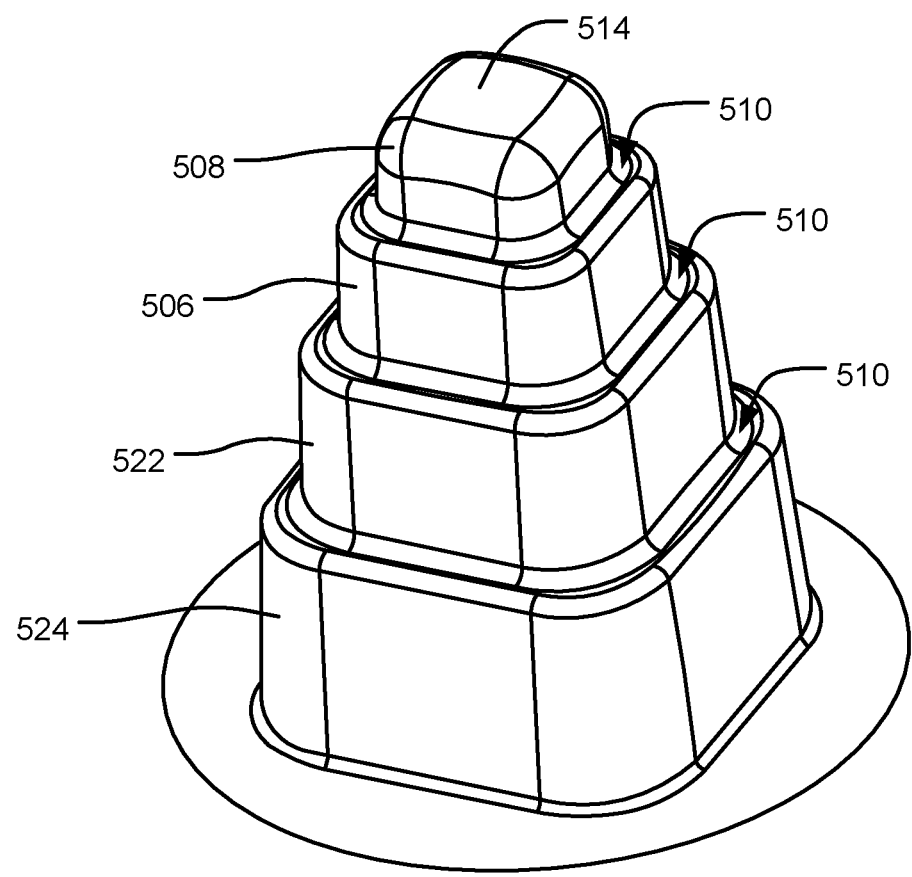
FIG. 5 illustrates a perspective view of another example tiered void cell.

FIG. 5 illustrates a perspective view of an example tiered void cell 500. The tiered void cell 500 in this implementation has four tiers, which comprises a plunger portion 508, a first base portion 506, a second base portion 522, and a third base portion 524. Each of the plunger portion 508, the first base portion 506, the second base portion 522, and the third base portion 524 is attached to a neighboring base portion or plunger portion via a living hinge 510. Specifically, there is a living hinge 510 connecting the outer perimeter of the plunger portion 508 to the inner perimeter of the first base portion 506. There is a living hinge 510 connecting the outer perimeter of the first base portion 506 to the inner perimeter of the second base portion 522. There is a living hinge 510 connecting the outer perimeter of the second base portion 522 to the inner perimeter of the third base portion 524. The plunger portion 508, the first base portion 506, the second base portion 522, and the third base portion 524 each have a square opening with a trapezoidal volume. The plunger portion 508 has a rounded top surface 514.

In one implementation, upon compression, compressive force may be applied to the top surface 514 of the plunger portion 508 or the bottom surface of the third base portion 524, and compress the plunger portion 508 into the first base portion 506 and/or the first base portion 506 into the second base portion 522, and/or the second base portion 522 into the third base portion 524. The living hinges 510 of void cell 500 can control (substantially promote or prevent) collapse of the plunger portion 508 of void cell 500 into the first base portion 506 of void cell 500, control the collapse of the first base portion 506 into the second base portion 522, and control the collapse of the second base portion 522 into the third base portion 524 depending on their width and depth, for example.

Figure 6:
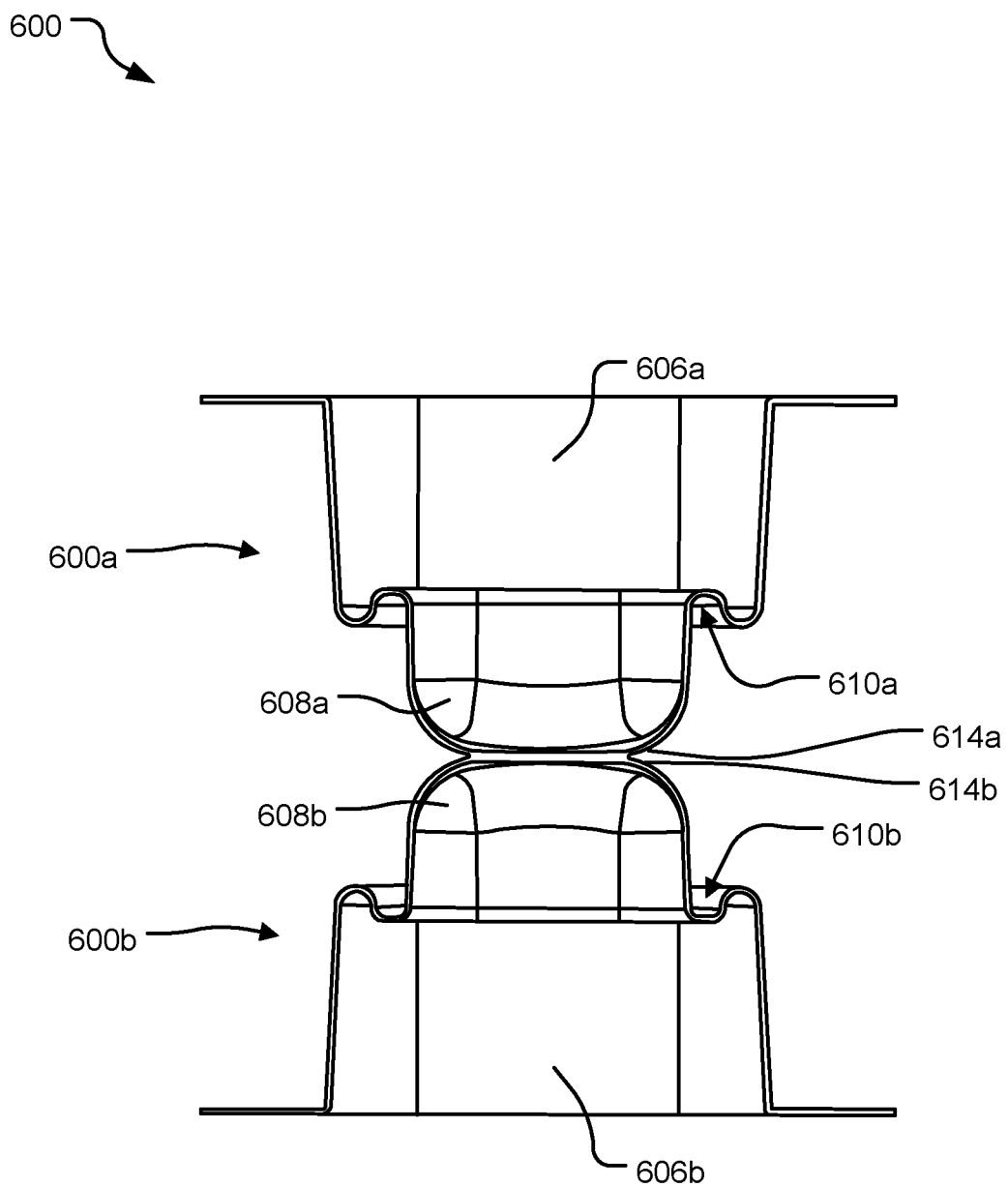
FIG. 6 illustrates a cross-sectional side view of example stacked tiered void cells.

FIG. 6 illustrates a cross-sectional side view of example stacked tiered void cells 600. Specifically, a two-tiered void cell 600a is shown stacked on top of another two-tiered void cell 600b. The two-tiered void cells 600 are shown stacked in opposite directions, with the rounded top surface 614a of one tiered void cell 600a attached to the rounded top surface 614b of the other tiered void cell 600b.

The stacked tiered void cells 600 in this implementation each have two tiers, each including a base portion 606a or base portion 606b, and a plunger portion 608a or a plunger portion 608b, respectively. The base portions 606a and 606b and the plunger portions 608a and 608b each have a square opening with a trapezoidal volume and are attached to each other via a living hinges 610a and 610b located between the upper perimeter of the base portions 606a and 608b and the lower perimeter of the plunger portions 608a and 608b.

In one implementation, upon compression, compressive force may be applied to the base portions 606a and 606b of the tiered void cell 600a and the tiered void cell 600b. The plunger portion 608a of the tiered void cell 600a can compress into the base portion 606a of the tiered void cell 600a, while simultaneously applying compressive force against the plunger portion 608b of the tiered void cell 600b. The plunger portion 608b of the tiered void cell 600b can collapse into the base portion 606b of the tiered void cell 600b.

In implementations where there are multiple tiered void cells stacked in a column with plunger portions opposing other plunger portions and base portions opposing other base portions, multiple plunger portions compress (or "plunge") into their respective base portions of a void cells as they compress against opposing plunger portions. The internal components and geometries of the multiple tiered void cells, such as the multiple plunger portions, define the "spring" mechanism of the column.

Figure 7:
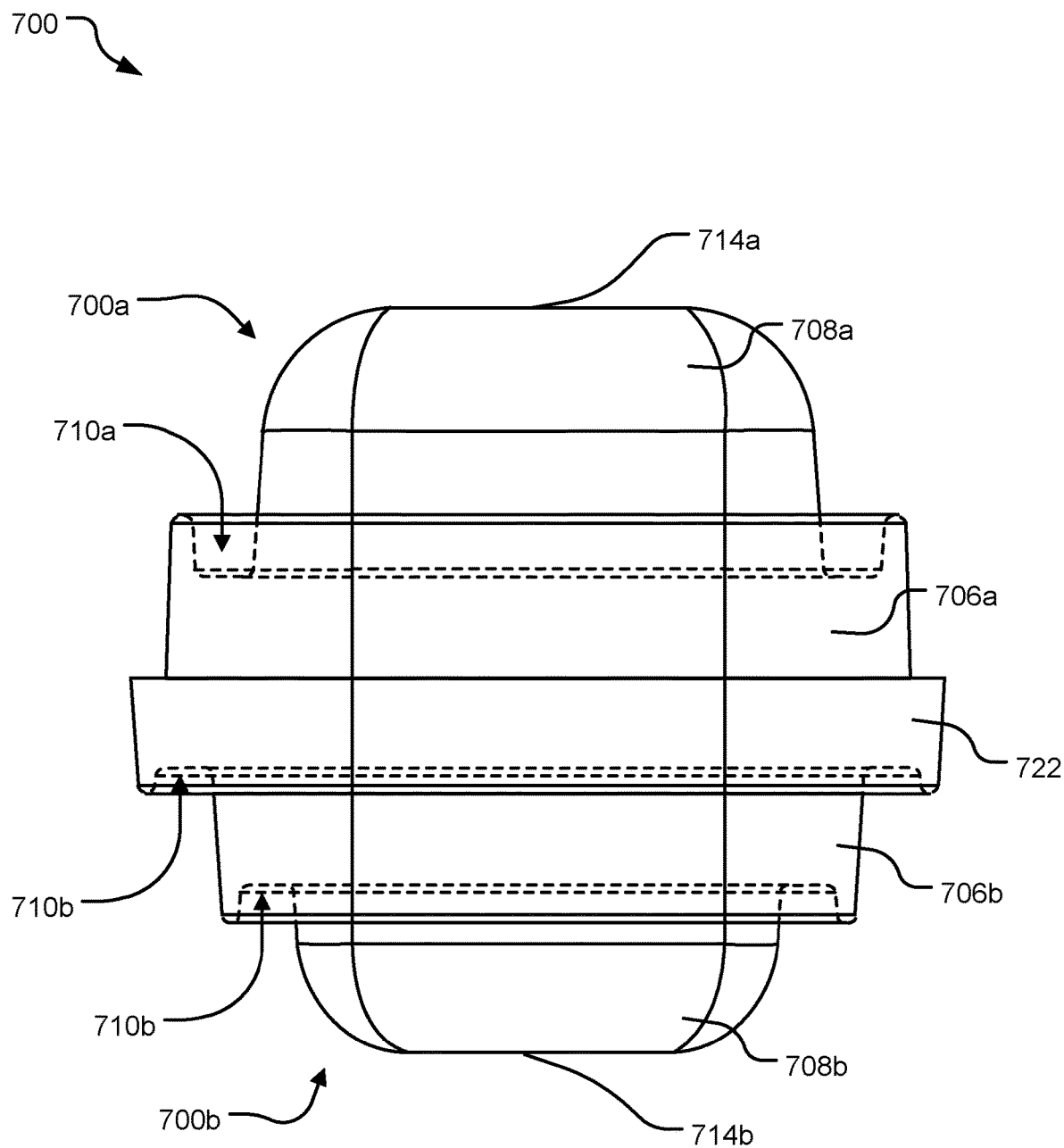
FIG. 7 illustrates a cross-sectional side view of example stacked tiered void cells.

FIG. 7 illustrates a cross-sectional side view of example stacked tiered void cells 700. Specifically, a two-tiered void cell 700a is shown stacked on top of a three-tiered void cell 700b. The tiered void cells 700 are shown stacked in opposite directions, with the bottom perimeter of a base portion 706a of the tiered void cell 700a attached to the bottom perimeter of a second base portion 722 of tiered void cell 700b.

The plunger portions 708a and 708b and the first base portions 706a and 706b of each of the tiered void cells 700, as well as the second base portion 722 of the tiered void cell 700b, each have a square opening with a trapezoidal volume. The plunger portions 708a and 708b of each of the tiered void cells 700 have rounded top surfaces 714a and 714b. The plunger portions 708a and 708b, the first base portions 706a and 706b, and the second base portion 722 are attached via living hinges 710a and 710b located between each tier of each of the tiered void cells 700.

In one implementation, upon compression, compressive force may be applied to the top surfaces 714a and 714b and compress the plunger portions 708a and 708b into the first base portions 706a and 706b of each of the tiered void cells 700. The compressive force may also compress the first base portion 706b into the second base portion 722 of the tiered void cell 700b. The living hinges 710a and 710b of tiered void cells 700 can control (substantially promote or prevent) collapse of the plunger portions 708a and 708b of each of the tiered void cells 700 into the first base portions 706a and 706b of each of the tiered void cells 700. The living hinge 710b may also control the collapse of the first base portion 706b into the second base portion 722 of the tiered void cell 700b.

FIG. 8 illustrates a perspective cross-sectional view of example stacked tiered void cells 800. Specifically, a three-tiered void cell is shown stacked on top of a two-tiered void cell 800b. The tiered void cells are shown stacked in opposite directions, with the rounded top surface 814a of one tiered void cell 800a attached to the rounded top surface 814b of the other tiered void cell 800b.

The plunger portions 808a and 808b and the first base portions 806a and 806b of each of the tiered void cells 800, as well as the second base portion 822 of the tiered void cell 800b, each have a square opening with a trapezoidal volume. The plunger portions 808a and 808b of each of the tiered void cells 800 have rounded top surfaces 814a and 814b. The plunger portions 808a and 808b, the first base portions 806a and 806b, and the second base portion 822 are attached via living hinges 810a and 810b located between each tier of each of the tiered void cells 800.

In one implementation, upon compression, compressive force may be applied to the bottom of the second base portion 822 of the tiered void cell 800a and/or the bottom surface of the first base portion 806b of the tiered void cell 800b, and compress the plunger portions 808a and 808b of each of the tiered void cells 800 into the first base portions 806a and 806b of each of the tiered void cells 800. In some implementations, the plunger portions 808a and 808b of each of the tiered void cells 800 may both compress into the first base portion 806b only. The compressive force may also compress the first base portion 806a into the second base portion 822, of the tiered void cell 800a. The living hinges 810a and 810b of tiered void cells 800 can control (substantially promote or prevent) collapse of the plunger portions 808s and 808b of each of the tiered void cells 800 into the first base portions 806a and 806b of each of the tiered void cells 800. The living hinge 810a may also control the collapse of the first base portion 806a into the second base portion 822 of the tiered void cell 800a.

In some implementations, the compressive force may be applied to the bottom of the second base portion 822 of the tiered void cell 800a and compress the plunger portion 808b of the tiered void cell 800b into the first base portion 806b of the tiered void cell 800b. As compression continues, the plunger portion 808a of the tiered void cell 800a also compresses into the first base portion 806b of the tiered void cell 800b. As compression further continues, the first base portion 806a of the tiered void cell 800a also compresses into the first base portion 806b of the tiered void cell 800b, until the second base portion 822 of the tiered void cell 800a slides past and is adjacent to the first base portion 806b of the tiered void cell 800b. In some implementations, the top wall of the second base portion 822 of the tiered void cell 800a may interfere with the top wall of the first base portion 806b of the tiered void cell 800b, slowing or inhibiting further collapse and compression of the stacked void cells.

Figure 9:
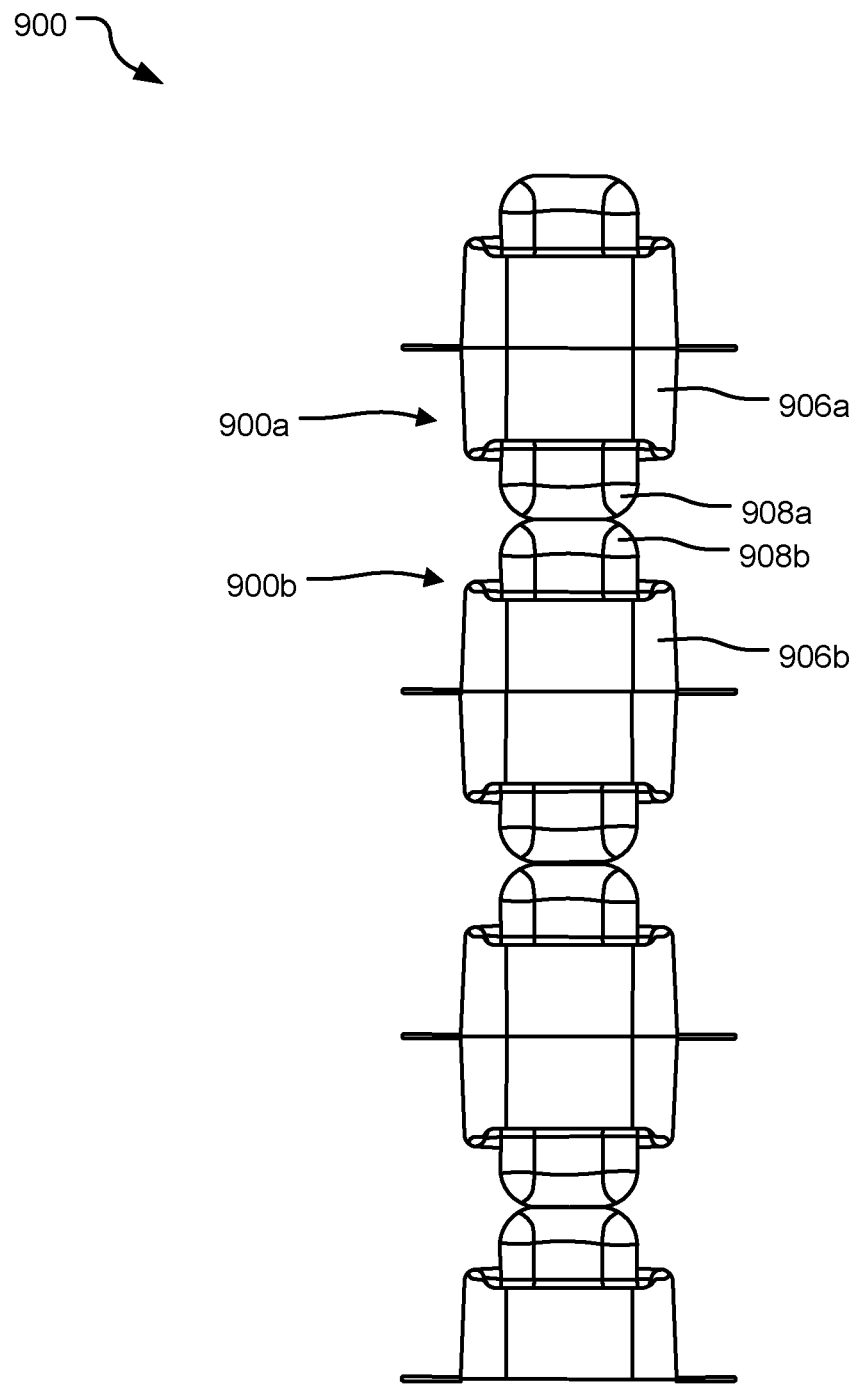
FIG. 9 illustrates a cross-sectional side view of example stacked tiered void cells.

FIG. 9 illustrates a cross-sectional side view of example stacked tiered void cells 900. In this implementation, two halves of a column of stacked tiered void cells 900 are shown molded together during the manufacturing process. The mold is configured for stacked tiered void cells 900 stacked sequentially in opposite direction. The plunger portions 908a and 908b of the tiered void cells may be adjacent to opposing plunger portions 908a and 908b. The base portions 906a and 906b may be adjacent to opposing base portions 906a and 906b. Each of the tiered void cells 900 have two tiers each.

Figure 10:
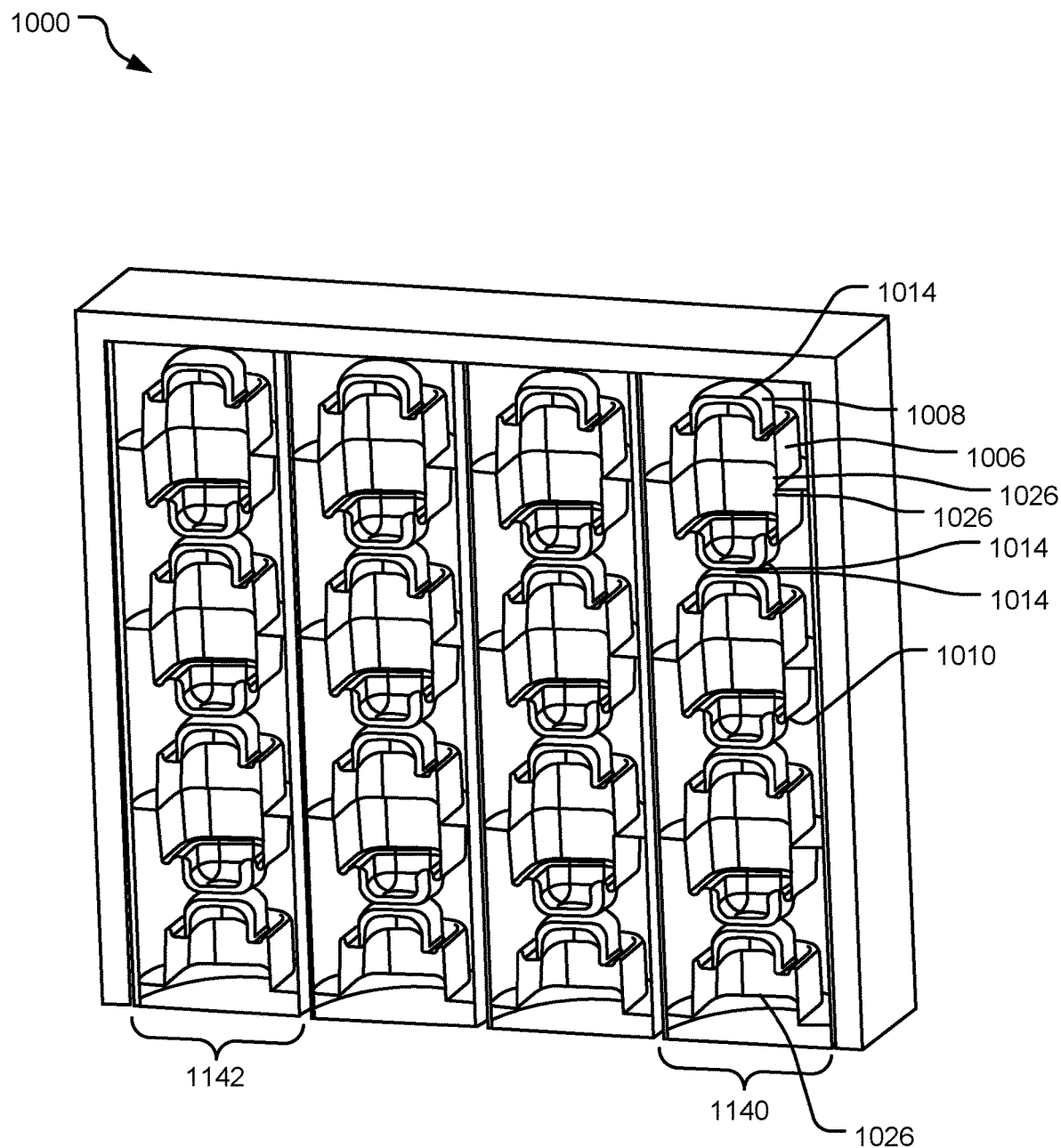
FIG. 10 illustrates a perspective cross-sectional view of an stacked tiered void cell array.

FIG. 10 illustrates a perspective cross-sectional view of an example stacked tiered void cell array 1000. In this implementation, the stacked tiered void cell array 1000 is shaped for an array of four vertically stacked columns 1042. Each column 1042 has seven stacked tiered void cells 1040. The tiered void cells 1040 in the stacked tiered void cell array 1000 are stacked in opposite direction, with either a rounded top surface 1014 of one tiered void cell 1040 attached to the rounded top surface 1014 of another tiered void cell 1040 or the opening 1026 at the bottom of one tiered void cell 1040 attached to the opening 1026 at the bottom of another tiered void cell 1040. In some implementations where the rounded top surface 1014 has a rounded dome, the tiered void cells 1040 are attached at the rounded domes of the rounded tops 1014 of each respective tiered void cell 1040.

The stacked tiered void cells 1040 in FIG. 10 each have two tiers, each of which comprise a base portion 1006, a plunger portion 1001, and a living hinge 1010. The base portion 1006 and the plunger portion 1008 each have a square opening with a trapezoidal volume. The base portion 1006 and the plunger portion 1008 are attached via a living hinge 1010. The has a rounded top surface 1014. In another implementation, the tiered void cells 1040 may have more than two tiers, and may have tiers with other shaped openings, volumes, and tops.

In this implementation, the columns 1042 of the stacked tiered void cells 1040 may be enclosed by fabric or other material in a housing (e.g., a mattress). The columns of stacked tiered void cells 1140 can be glued or otherwise affixed to the fabric or other material.

FIG. 11A-C illustrate a side perspective view of an example array of stacked tiered void cells 1100 prior to and during compression. FIG. 11A illustrates a side view of example stacked tiered void cells 1100 prior to compression. In this implementation, two-tiered void cells 1100 are shown stacked, in opposite direction, with a rounded top surface 1114a of the plunger portion 1108a of one void cell 1100a adjacent to a rounded top surface 1114b of the plunger portion 1108b of the other tiered void cell 1100b. The stacked tiered void cells in this implementation each have two tiers connected via living hinges 1110a and 1110b located between the tiers. A force 1170 is shown that is configured to apply compressive force to the tiered void cell 1100a.

FIG. 11B illustrates a side view of example stacked tiered void cells during an initial compression mode or initial load deflection (ILD) mode. In this implementation, two-tiered void cells 1100 are shown stacked, in opposite direction, with the rounded top surface 1114a of the plunger portion 1108a of one void cell 1100a adjacent to the rounded top surface 1114b of the plunger portion 1108b of the other tiered void cell 1100b.

In FIG. 11B, upon compression, compressive force is first applied to the tiered void cell 1100a, as shown. The rounded top surfaces 1114a and 1114b of the plunger portions 1108a and 1108b of the tiered void cells 1100 begin to collapse into each other, and into their respective plunger portions 1108a and 1108b, as shown.

FIG. 11C illustrates a side view of example stacked tiered void cells during compression. In this implementation, two-tiered void cells 1100 are shown stacked, in opposite direction, with opposing plunger portions 1108a and 1108b of the tiered void cells 1100 telescoping into their respective base portions 1106a and 1106b.

In some implementations, the number of tiers and the material can vary, which can impact the compression of the tiered void cells 100. Some void cells 1100 may be more rigid than others. In some implementations where the tiered void cells 1100 are less rigid, there may be rotation of the tiered void cells 1100 stacked against each other, acting as a pressure reliever. In some implementations, varying the number of tiers and the material can vary which tiers telescope into other tiers and at different rates. For example, if void cell 1100*a* was a less rigid two-tier void cell, it may telescope in its entirety into a more rigid three-tiered void cell 1100*b* upon compression, and the more rigid three-tiered void cell 1100*b* may have less compression within its tiers.

FIG. 12 illustrates a side perspective view of an example array of stacked tiered void cells 1200 during compression. In the example array of stacked tiered void cells 1200, six rows of two-tiered void cells are shown stacked in opposite directions, with the rounded top surface of a plunger portion of one tiered void cell attached to the rounded top surface of a plunger portion of another tiered void cell.

In some implementations, the array 1200 of void cells can be molded from bulk material. In one implementation, a common tiered void cell geometry is achieved by reusing a mold or set of molds to produce the individual tiered void cells in the array 1200.

In some implementations, varying the number of tiers and the material in a void cell stack can impact independence, rotation, flexibility, amount of compressions, and which tiers telescope into other tiers and at different rates, in a cushioning system. The shape and weight of a force 1250 can also impact the rotation of a void cell stack. A "force" may be defined as a component, apparatus, or object that applies compressive force. For example, if a cushioning system is a seating, and the force 1250 is a person's body sitting on the seating, the distribution of force and weight across a cushioning system may vary.

A force 1250 may apply compressive force to the tiered void cells 1200. Some void cells 1200 may be more rigid than others. In some implementations where the tiered void cells 1200 are less rigid, there may be rotation of the tiered void cells 1200 stacked against each other, acting as a pressure reliever. For example, void cell stacks 1252, 1254, and 1256 show that when the force 1250 compresses the tiered void cell 1200, the tiered void cell stacks 1252, 1254, and 1256 compress at different depths and angles.

In this implementation, upon compression, when compressive force is applied to each void cell, the plunger portion of each tier can collapse (or "plunge") against an opposing plunger portion of another void cell and into the base portion of each tiered void cell, while simultaneously applying compressive force against the plunger portion of the opposing tiered void cell. The internal components and geometries of the multiple tiered void cells, such as the living hinges and multiple plunger portions, define the "spring" mechanism of the column. The plunger portion of each tier can collapse against an opposing plunger portion of another void cell and into the base portion of each tiered void cell by deforming a first living hinge elastically connecting an inner perimeter of the first base portion to an outer perimeter of the first plunger portion. Each tiered void cell within the array 1200 may have individual or common force-deflection characteristics.

In one implementation, as shown in FIG. 12, a force 1250 elastically collapsing the tiered void cells 1200 may be shaped in a way that when the force 1250 applies compressive force to the tiered void cells 1200, each individual tiered void cell in the array 1200 moves independently of an adjacent tiered void cell (not shown). For example, if the force 1250 was a person sitting on a cushioning system comprising of void cells 1200, there may be different loads applied on different void cells 1200. Therefore, the tiered void cells 1200 may compress in different directions and in different depths. For example, the tiered void cell stacks 1252, 1254, and 1256 show side-loading of compressive force (see void cell stacks 1252 and 1256 tilted down toward the right, and void cell stack 1254 tilted down toward the left. The disclosed arrangement of the tiered void cells 1200 provides isolation which contributes to distribution of forces and comfort as the tiered void cells support a body, for example.

FIG. 13 illustrates a side perspective view of an example array of stacked tiered void cells in a cushioning system 1300. In the cushioning system 1300, rows or arrays 1360 of two-tiered void cells are shown stacked in opposite directions.

In some implementations, the cushioning system 1300 may be a mattress or seating apparatus. The cushioning system 1300 may have a first cushioning layer 1356 and a second cushioning layer 1358. The first cushioning layer 1356 and the second cushioning layer 1358 may vary in sizes and materials, depending on an implementation (e.g., dense foam, springs, etc.). As shown in FIG. 13, the first cushioning layer 1356 is thicker than the second cushioning layer 1358. In some implementations, for example in a mattress, the first cushioning layer 1356 may be layers of dense foam, and the second cushioning layer 1358 may be springs. In another implementation, the first cushioning layer 1356 and the second cushioning layer 1358 may both include dense foam. In some implementations, there may be a first cushioning layer 1356 and no second cushioning layer 1358. For example, a mattress may include only a first cushioning layer 1356 and stacked tiered void cells.

FIG. 13 shows the cushioning system 1300 with two stacked tiered void cells, however, in other implementations, there may be a plurality of stacked tiered void cells, as shown in FIG. 1. The stacked void cells may be open or closed, and formed as a sheet or individual, depending on the required independence for the distribution of forces and comfort as the tiered void cells support a body, for example. In some implementations, the stacked void cells may be formed as a sheet and the sheet may be cut to an intended implementation. In some implementations, the void cells may be formed individually for one layer or array, and formed as a sheet for a second stacked layer or array.

FIG. 14 illustrates a side view of an example array of stacked tiered void cells in a cushioning system 1400. In the cushioning system 1400, rows or arrays 1460 of two-tiered void cells are shown stacked in opposite directions.

In some implementations, the cushioning system 1400 may be a mattress or seating apparatus. The cushioning system 1400 may have a first cushioning layer 1456 and a second cushioning layer 1458. The first cushioning layer 1456 and the second cushioning layer 1458 may vary in sizes and materials, depending on an implementation. As shown in FIG. 14, the first cushioning layer 1456 is thicker than the second cushioning layer 1458.

FIG. 15 illustrates a side view of an example array of stacked tiered void cells in a cushioning system 1500. In the cushioning system 1500, rows or arrays 1560 of two-tiered void cells are shown stacked in opposite directions.

In some implementations, the cushioning system 1500 may be a mattress or seating apparatus. The cushioning system 1500 may have a first cushioning layer 1556 and a second cushioning layer 1558. The first cushioning layer 1556 and the second cushioning layer 1558 may vary in sizes and materials, depending on an implementation. As shown in FIG. 15, the first cushioning layer 1556 is of varying thickness. The first cushioning layer 1556 may have thicker section where additional cushioning layer is required or desired. For example, at least two distinct depths of the cushioning layer may be based on a predetermined support requirement. The second cushioning layer 1558 has little to no thickness.

FIG. 16 illustrates a side view of an example array of stacked tiered void cells in a cushioning system 1600. In the cushioning system 1600, rows or arrays 1660 of two-tiered void cells are shown stacked in opposite directions.

In some implementations, the cushioning system 1600 may be a mattress or seating apparatus. The cushioning system 1600 may have layers around the rows or arrays 1660 of two-tiered void cells that may be cushioning layers, but in some implementations, may be other materials. Referring to FIG. 16, a first cushioning layer 1656 and a second cushioning layer 1658 are shown. The first cushioning layer 1656 and the second cushioning layer 1658 may vary in sizes and materials, depending on an implementation. As shown in FIG. 16, the first cushioning layer 1656 is of varying thickness throughout the cushioning system 1600. The first cushioning layer 1656 may have thicker section where additional cushioning layer is required or desired. The second cushioning layer 1558 has little to no thickness.

FIG. 17 is examples operations 1700 for using a cushioning system. An operation 1702 applies compressive force to an array of stacked and opposing tiered void cells. An operation 1704 collapses a first plunger portion into a first base portion of a tiered void cell by deforming a first living hinge elastically connecting an inner perimeter of the first base portion to an outer perimeter of the first plunger portion.

An operation 1706 collapses the first base portion into a second base portion of a tiered void cell by deforming a second living hinge elastically connecting an inner perimeter of the second base portion to an outer perimeter of the first base portion.

An operation 1708 collapses a second plunger portion into a second base portion of a tiered void cell opposing at least one other of the tiered void cells by deforming a second living hinge elastically connecting an inner perimeter of the second base portion to an outer perimeter of the second plunger portion.

In some implementations, the base portion of the tiered void cell may be compressed into a second base portion of the tiered void cell, if the tiered void cell has more than two tiers. In some implementations, the plunger portion of the tiered void cell may be compressed into a second plunger portion of an opposing second tiered void cell. In some implementations, the second plunger portion of the second tiered void cell may be compressed into a second base portion of the second tiered void cell. Depending on the dimensions and the number of tiers in two opposing tiered void cells, a plurality of tiers may telescope within one or both of the tiered void cells.

The operations 1700 may also include stretching a top wall of the base portion, a first side wall and/or a bottom wall of a living hinge in the tiered void cell. During compression, in some implementations, other walls in the tiered void cells can stretch, rotate, and buckle. For example, at least one of a top wall of the base portion, and the first side wall and the bottom wall of the living hinge may rotate. In another example, at least one of a side wall of the base portion, a second side wall of the living hinge, and a top wall of the plunger portion may buckle.

The logical operations making up the embodiments of the invention described herein are referred to variously as operations, steps, objects, or modules. Furthermore, it should be understood that logical operations may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A cushioning system comprising: an array of tiered void cells, wherein each tiered void cell includes: a base portion; a plunger portion, the plunger portion to collapse into the base portion under compression of the cushioning system; and a living hinge elastically connecting an inner perimeter of the base portion to an outer perimeter of the plunger portion, the living hinge to stretch to effect the collapse of the plunger portion into the base portion under compression of the cushioning system; wherein the living hinge forms a channel between the base portion and the plunger portion.

2. The cushioning system of claim 1, wherein an elastic modulus and a buckling force of one or more walls of each tiered void cell controls collapsibility of each tiered void cell.

3. The cushioning system of claim 1, incorporated within at least one of a mattress and a seat.

4. The cushioning system of claim 1, wherein the array of tiered void cells is stacked vertically in columns.

5. The cushioning system of claim 4, wherein each of the vertical columns are enclosed in an encasing.

6. The cushioning system of claim 4, wherein the vertical columns are attached to neighboring vertical columns.

7. The cushioning system of claim 1, further comprising:
   a cushioning layer positioned adjacent the array of tiered void cells.

8. The cushioning system of claim 7, wherein the cushioning layer has at least two distinct depths based on a predetermined support requirement.

9. A tiered void cell comprising: a first base portion; a first plunger portion to collapse into the first base portion under compression of the tiered void cell; a first living hinge to elastically connect an inner perimeter of the first base portion to an outer perimeter of the first plunger portion, the first living hinge to stretch to effect the collapse of the first plunger portion into the first base portion under compression of the tiered void cell; wherein the first living hinge forms a channel between the first base portion and the first plunger portion; a second base portion; a second plunger portion to collapse into the second base portion under compression of the tiered void cell; and a second living hinge to elastically connect an inner perimeter of the second base portion to an outer perimeter of the second plunger portion, the second living hinge to stretch to effect the collapse of the second plunger portion into the second base portion under compression of the tiered void cell, and the first plunger portion attached to and opposing the second plunger portion; wherein the second living hinge forms a channel between the second base portion and the second plunger portion.

10. The tiered void cell of claim 9, further comprising:
    a third base portion attached to the first base portion, the first base portion to collapse into the third base portion under compression of the tiered void cell.

11. The tiered void cell of claim 9, wherein an elastic modulus and a buckling force of one or more walls of the tiered void cell controls collapsibility of the tiered void cell.

12. The tiered void cell of claim 9, the living hinge to one or more of stretch, rotate, and buckle under compression of the tiered void cell.

13. The tiered void cell of claim 9, the first base portion to meet and collapse against the second base portion under compression of the tiered void cell.

14. The tiered void cell of claim 9, the first base portion to slide inside the second base portion under compression of the tiered void cell.

15. A method of using a cushioning system, the method comprising: applying compressive force to an array of stacked and opposing tiered void cells; and collapsing a first plunger portion into a first base portion of at least one of the tiered void cells by stretching a first living hinge elastically connecting an inner perimeter of the first base portion to an outer perimeter of the first plunger portion under compressive force; wherein the first living hinge forms a channel between the first base portion and the first plunger portion.

16. The method of claim 15, further comprising:
collapsing the first base portion into a second base portion of the at least one tiered void cell by deforming a second living hinge elastically connecting an inner perimeter of the second base portion to an outer perimeter of the first base portion.

17. The method of claim 15, further comprising:
collapsing a second plunger portion into a second base portion of at least one of the tiered void cells opposing at least one other of the tiered void cells by deforming a second living hinge elastically connecting an inner perimeter of the second base portion to an outer perimeter of the second plunger portion.

18. The method of claim 15, wherein deforming the first hinge includes:
stretching a top wall of the first base portion; and
stretching a side wall and a bottom wall of the first living hinge.

19. The method of claim 15, wherein deforming the first hinge includes:
rotating a top wall of the first base portion; and
rotating a side wall and a bottom wall of the first living hinge.

20. The method of claim 15, wherein deforming the first living hinge includes:
buckling a side wall of the first base portion;
buckling a second side wall of the first living hinge; and
buckling a top wall of the first plunger portion.

21. The cushioning system of claim 1, wherein the living hinge has an s-shaped section.

* * * * *